US012485829B2

(12) United States Patent
Toriumi

(10) Patent No.: US 12,485,829 B2
(45) Date of Patent: Dec. 2, 2025

(54) OPENING/CLOSING BODY LOCK DEVICE

(71) Applicant: PIOLAX, INC., Kanagawa (JP)

(72) Inventor: Katsuya Toriumi, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 109 days.

(21) Appl. No.: 18/019,035

(22) PCT Filed: Aug. 27, 2021

(86) PCT No.: PCT/JP2021/031441

§ 371 (c)(1),
(2) Date: Jan. 31, 2023

(87) PCT Pub. No.: WO2022/050177

PCT Pub. Date: Mar. 10, 2022

(65) Prior Publication Data

US 2023/0278502 A1 Sep. 7, 2023

(30) Foreign Application Priority Data

Sep. 3, 2020 (JP) ................................ 2020-148301

(51) Int. Cl.
*E05B 77/38* (2014.01)
*B60R 7/06* (2006.01)
(Continued)

(52) U.S. Cl.
CPC ................ *B60R 7/06* (2013.01); *E05B 77/38* (2013.01); *E05B 81/06* (2013.01); *E05B 83/30* (2013.01); *E05C 9/04* (2013.01)

(58) Field of Classification Search
CPC .......... E05B 77/36; E05B 77/38; E05B 77/42; E05B 81/06; E05B 81/34; E05B 81/50;
(Continued)

(56) References Cited

U.S. PATENT DOCUMENTS 7,195,292 B2 * 3/2007 Ketelsen ................. E05B 77/38 292/201
7,780,205 B2 * 8/2010 Graute .................... E05B 77/38 292/201
(Continued)

FOREIGN PATENT DOCUMENTS

JP S60-194070 U121985 12/1985
JP 5940508 B2 6/2016
(Continued)

OTHER PUBLICATIONS

Nov. 16, 2021, International Search Report issued for related PCT Application No. PCT/JP2021/031441.
(Continued)

*Primary Examiner* — Kristina R Fulton
*Assistant Examiner* — Noah Horowitz
(74) *Attorney, Agent, or Firm* — Paratus Law Group, PLLC

(57) ABSTRACT

There is provided a locking device for an opening and closing body, including: a locking portion; a base; a rotation body that includes a protruding portion on a part of an outer periphery thereof; a locking member; and an elastic member that includes a base portion, and a stopper portion configured to restrict a maximum rotation position of the rotation body in a predetermined direction by abutting against the protruding portion of the rotation body. The stopper portion is disposed in a manner of being biased in a direction opposite to the predetermined direction relative to the base portion. A part of the outer periphery of the rotation body is provided with a sliding contact portion that is configured to come into sliding contact with the elastic member in a process in which the protruding portion approaches the stopper portion.

6 Claims, 24 Drawing Sheets

(51) Int. Cl.

| | |
|---|---|
| ***E05B 81/06*** | (2014.01) |
| ***E05B 83/30*** | (2014.01) |
| ***E05C 9/04*** | (2006.01) |

(58) Field of Classification Search

CPC .......... E05B 83/28; E05B 83/30; E05B 83/32; E05C 9/04; E05C 9/041; E05C 9/043; E05C 9/048; E05C 9/10; E05C 9/12; E05C 9/16

See application file for complete search history.

(56) References Cited

U.S. PATENT DOCUMENTS

| | | | | |
|---|---|---|---|---|
| 9,689,183 | B2 * | 6/2017 | Ito | E05B 81/06 |
| 10,030,420 | B2 * | 7/2018 | Jidaisho | E05B 81/16 |
| 10,738,511 | B2 * | 8/2020 | Nakasone | E05C 9/04 |
| 11,066,855 | B2 * | 7/2021 | Komatsu | E05C 9/041 |
| 11,220,847 | B2 * | 1/2022 | Nelsen | E05B 83/00 |
| 11,814,881 | B2 * | 11/2023 | Minnich | E05C 9/006 |
| 12,049,773 | B2 * | 7/2024 | Carabalona | E05B 13/10 |
| 2015/0115619 | A1 | 4/2015 | Ito et al. | |
| 2018/0371795 | A1 * | 12/2018 | Nakasone | E05C 9/041 |
| 2021/0172220 | A1 * | 6/2021 | Bishop | E05B 77/38 |
| 2022/0341224 | A1 * | 10/2022 | Minnich | E05C 9/043 |
| 2022/0364394 | A1 * | 11/2022 | Schiffer | E05B 77/38 |

FOREIGN PATENT DOCUMENTS

| | | | | |
|---|---|---|---|---|
| JP | 2020-101060 A | | 7/2020 | |
| WO | WO-2017078121 A1 | * | 5/2017 | B60R 7/06 |
| WO | WO 2021/085342 A1 | | 5/2021 | |

OTHER PUBLICATIONS

Nov. 16, 2021, International Search Opinion issued for related PCT Application No. PCT/JP2021/031441.

* cited by examiner

OPENING/CLOSING BODY LOCK DEVICE

CROSS REFERENCE TO PRIOR APPLICATION

This application is a National Stage Patent Application of PCT International Patent Application No. PCT/JP2021/031441 (filed on Aug. 27, 2021) under 35 U.S.C. § 371, which claims priority to Japanese Patent Application No. 2020-148301 (filed on Sep. 3, 2020), which are all hereby incorporated by reference in their entirety.

TECHNICAL FIELD

The present invention relates to a locking device for an opening and closing body, which is used for locking an opening and closing body, which is openably and closably attached to an opening portion of a fixed body, in a closed state.

BACKGROUND ART

For example, an opening and closing body such as a lid is openably and closably attached to an opening portion formed in a fixed body such as a glove box of an automobile. A locking device is provided between the opening portion and the opening and closing body so as to lock the opening and closing body when the opening and closing body is closed and to release the lock when the opening and closing body is to be opened.

For example, Patent Literature 1 below describes a lid locking device including a housing, a locking member, a motor for driving the locking member, a worm gear and a worm wheel, a wheel side wall provided al an outer edge portion of the worm wheel, a rotation restriction wall extending inward from the wheel side wall, a stopper protrusion that protrudes from an inner surface of the housing and abuts against the rotation restriction wall to restrict a rotation range of the worm wheel, and a buffer portion (cushion rubber) that is provided in the stopper protrusion and abuts against the rotation restriction wall to be elastically deformed.

In addition, the cushion rubber is formed in a substantially quadrangular outer edge shape, and has a structure in which a mounting hole and a buffer hole are provided side by side. The cushion rubber is mounted by inserting, into the mounting hole, a first rotation restricting-projection protruding from an inner surface of the housing.

Then, when a lid open switch is turned on to open the lid during refueling or the like, the motor rotates, the worm wheel rotates rearward, and the worm wheel rotates from a forward rotation limit position (see FIG. 11 of Patent Literature 1) to a rearward rotation limit position (see FIG. 12 of Patent Literature 1). At this time, the rotation restriction wall of the worm wheel comes into contact with a curved side surface of the cushion rubber on the buffer hole side, and the cushion rubber is bent and deformed so as to crush the buffer hole (see FIG. 12 of Patent Literature 1), so that the shock is absorbed and the rotation is restricted.

CITATION LIST

Patent Literature

Patent Literature 1: JP5940508B

SUMMARY OF INVENTION

Technical Problem

In the lid lock device of Patent Literature 1, when the worm wheel is rotated, the rotation restriction wall only abuts against the curved side surface of the cushion rubber on the buffer hole side, so that the impact absorption performance is not sufficient, and it is difficult to suppress the striking noise.

Accordingly, an object of the present invention is to provide a locking device for an opening and closing body that can suppress striking noise when a rotation body rotates and a rotation is restricted.

Solution to Problem

In order to achieve the above object, the present invention provides a locking device for an opening and closing body that is openably and closably attached to an opening portion of a fixed body. The locking device includes: a locking portion that is to be provided in one of the fixed body or the opening and closing body; a base that is to be disposed on another of the fixed body or the opening and closing body; a rotation body that is rotatably accommodated in or placed on the base and includes a protruding portion on a part of an outer periphery thereof; a locking member that is configured to slide in conjunction with rotation of the rotation body and configured to engage with and disengage from the locking portion; and an elastic member that includes a base portion locked and supported by a support portion provided on the base, and a stopper portion configured to restrict a maximum rotation position of the rotation body in a predetermined direction by abutting against the protruding portion of the rotation body. The stopper portion of the elastic member is disposed in a manner of being biased in a direction opposite to the predetermined direction relative to the base portion. A part of the outer periphery of the rotation body is provided with a sliding contact portion that is configured to come into sliding contact with the elastic member in a process in which the protruding portion approaches the stopper portion.

Advantageous Effects of Invention

According to the present invention, when the rotation body rotates in a predetermined direction, that is, when the rotation body rotates in a direction in which the protruding portion of the rotation body approaches the stopper portion of the elastic body, the sliding contact portion of the rotation body comes into sliding contact with the elastic member, and the protruding portion of the rotation body collides with the stopper portion while attenuating the rotational speed of the rotation body, thereby stopping the rotation of the rotation body. At this time, the stopper portion of the elastic member is disposed in a manner of being biased in the direction opposite to the predetermined direction of the rotation body relative to the base portion, so that the rotation of the rotation body can be stopped with cushioning properties, and the striking noise can be effectively reduced in combination with the rotational speed attenuating effect in the sliding contact portion.

BRIEF DESCRIPTION OF DRAWINGS

FIGS. 1A and 1B illustrate an embodiment of a locking device for an opening and closing body according to the present invention, in which FIG. 1A is a perspective view illustrating a state where the opening and closing body is closed, and FIG. 1B is a perspective view showing a state where the opening and closing body is opened.

FIGS. 7A and 7B show an elastic member of the locking device, in which FIG. 7A is a perspective view thereof, and FIG. 7B is a plan view thereof

FIGS. 11A and 11B show a relationship between the second case of the base and the elastic member in the locking device, in which FIG. 11A is a front view illustrating a state where the elastic member is not supported by a support portion, and FIG. 11B is a front view illustrating a state where the elastic member is supported by the support portion.

DESCRIPTION OF EMBODIMENTS

One Embodiment of Locking Device for Opening and Closing Body

Hereinafter, an embodiment of a locking device for an opening and closing body according to the present invention will be described with reference to the drawings.

Figure 19:
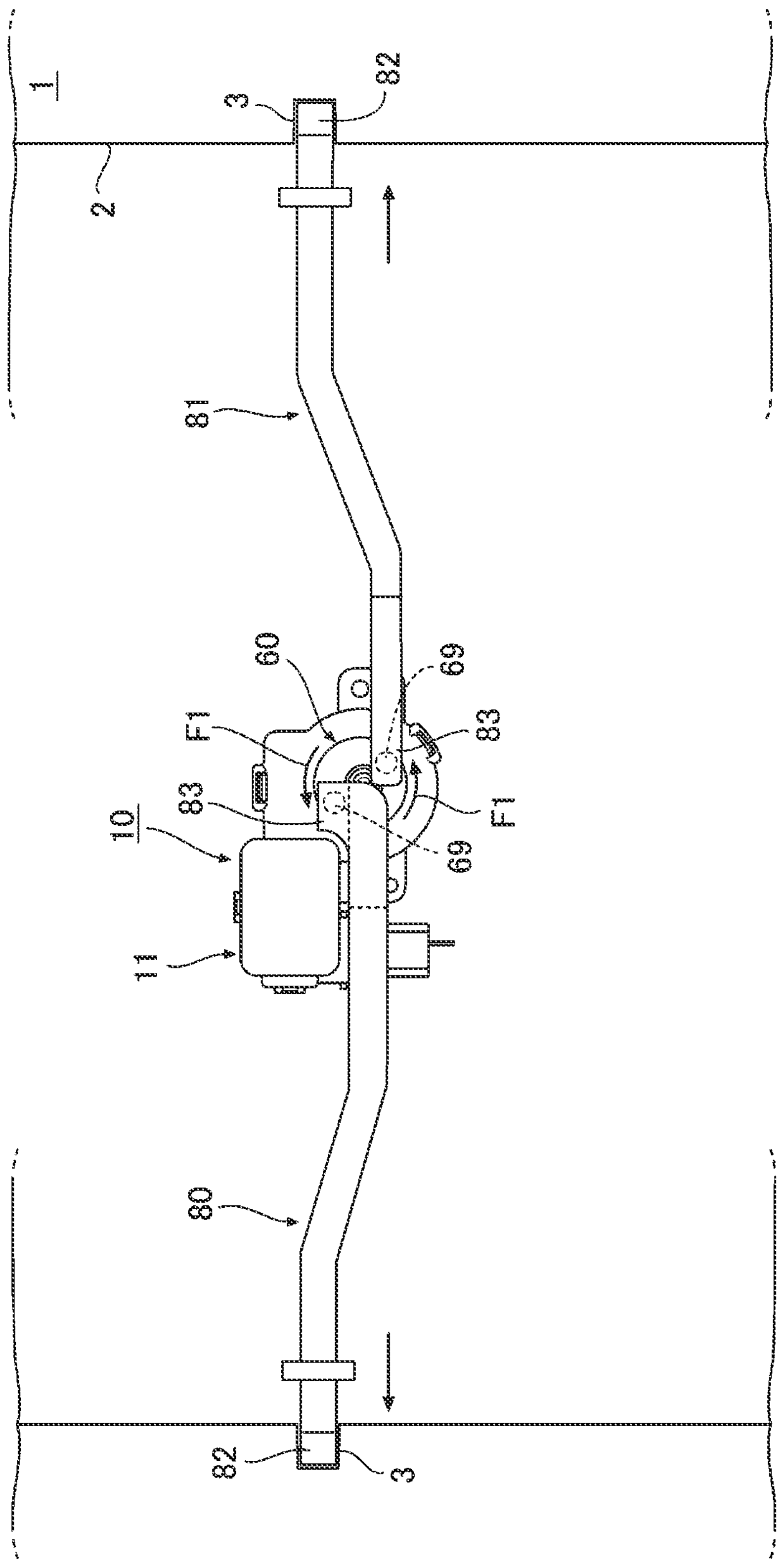
FIG. 19 is an illustration view of a state where the opening and closing body is closed by the locking device.
Figure 20:
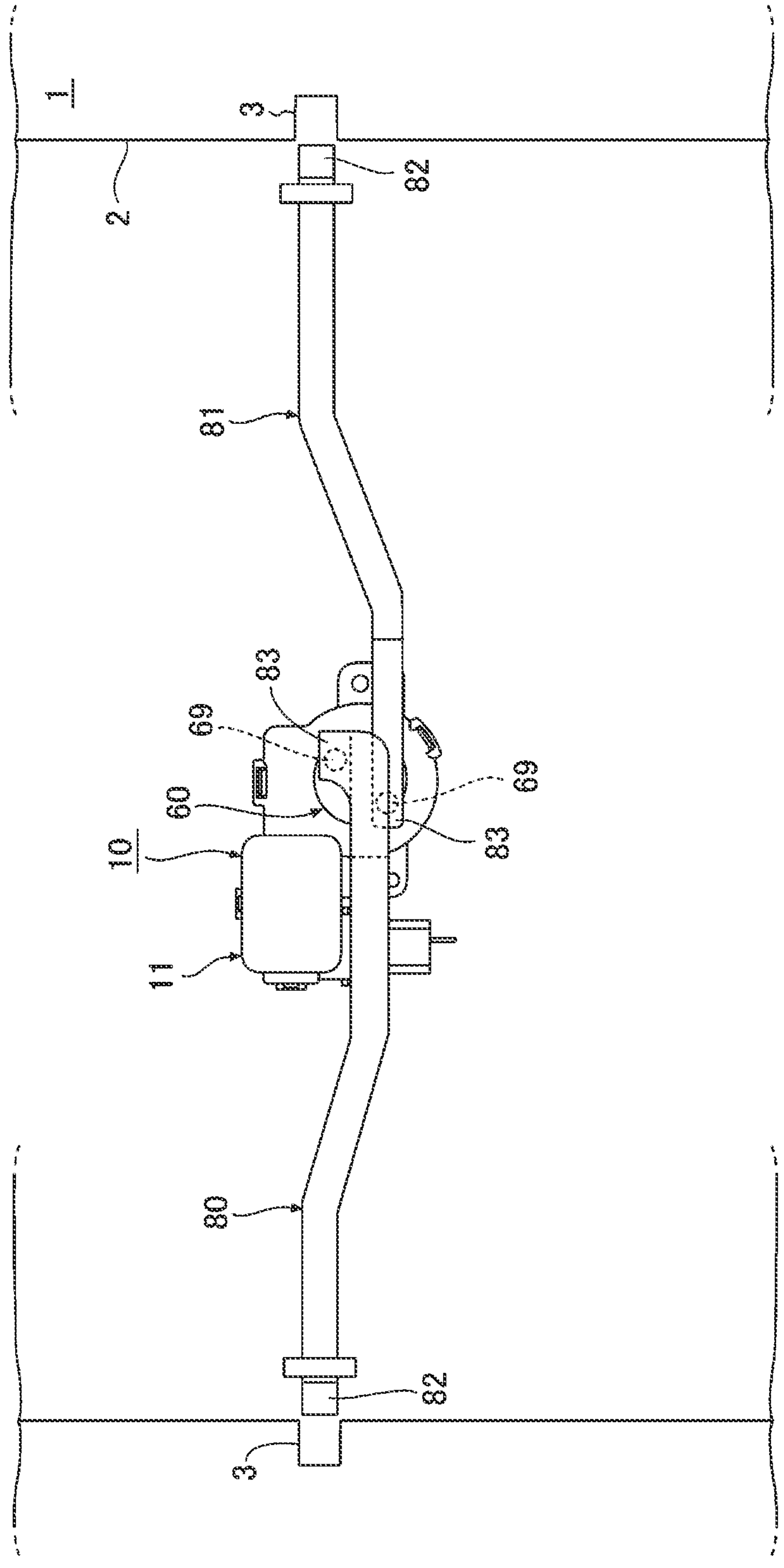
FIG. 20 is an illustration view of a state where the opening and closing body is opened by the locking device.

As illustrated in FIGS. 19 and 20, a locking device 10 for an opening and closing body (hereinafter, also simply referred to as "locking device 10") in the present embodiment is used to lock an opening and closing body 5 such as a glove box, which is openably and closably attached to an opening portion 2 of a fixed body 1 such as an instrument panel of a vehicle, in a closed state. In particular, the locking device 10 of the present embodiment enables the opening and closing body 5 locked in a closed state with respect to the opening portion 2 of the fixed body 1 to be electrically opened by a motor 13 or the like. However, the locking device for the opening and closing body may be applied not only to a structure in which the opening and closing body is electrically opened, but also to a structure in which the opening and closing body is mechanically opened by human power of an operator (which will be described in an embodiment to be described later).

Also referring to FIGS. 1A to 3, the locking device 10 of the present embodiment includes a pair of locking portions 3, 3 provided in the opening portion 2 of the fixed body 1, a case-shaped base 11 disposed on the opening and closing body 5, a rotation body 60 rotatably accommodated or placed in the base 11, a pair of locking members 80, 81 that slide in conjunction with rotation of the rotation body 60 and engage with and disengage from the locking portions 3, 3, and an elastic member 90 having a base portion 91 and a stopper portion 92.

As described above, the locking device for the opening and closing body may be applied to, for example, a structure in which a box-shaped glove box is rotatably attached to an opening portion of an instrument panel (in this case, the instrument panel serves as a "fixed body" and the glove box serves as an "opening and closing body"), or a structure in which a lid is openably and closably attached to an opening portion of an instrument panel (in this case, the instrument panel serves as a "fixed body" and the lid serves as an "opening and closing body"), and the locking device can be widely used for various opening and closing bodies that open and close an opening portion of a fixed body.

As illustrated in FIGS. 19 and 20, in the present embodiment, a pair of hole-shaped locking portions 3, 3 are provided on both sides of the opening portion 2 of the fixed body 1 in a width direction, respectively. The locking portion may not have the hole shape, and may have a recessed shape, a projection shape, a frame shape, or the like. In addition, the locking portion may be provided in the opening and closing body instead of the fixed body, and is not particularly limited.

The locking device 10 includes a torsion spring 12 serving as an urging member that rotationally urges the rotation body 60, and the motor 13 that rotates the rotation body 60 in a direction opposite to a rotation urging direction of the torsion spring 12 via a worm 14.

Figure 10:
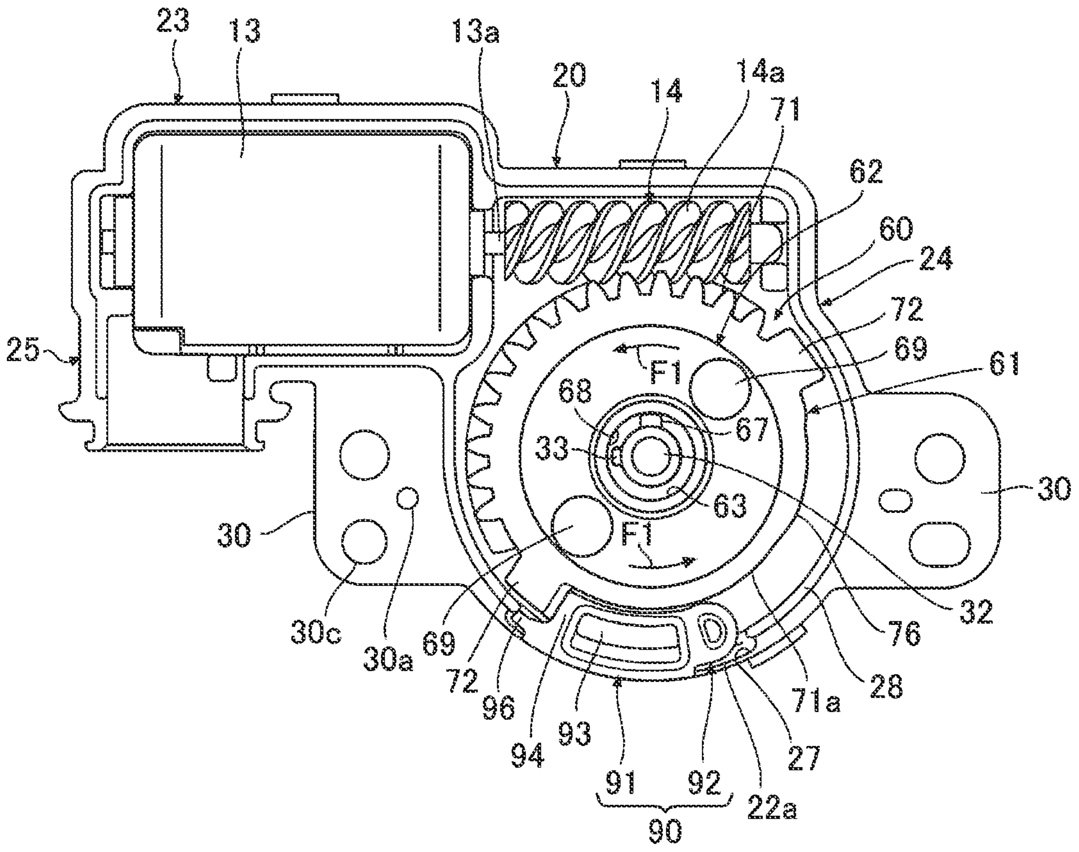
FIG. 10 is a plan view of the locking device in a state where the second case and the like are removed.
Figure 12:
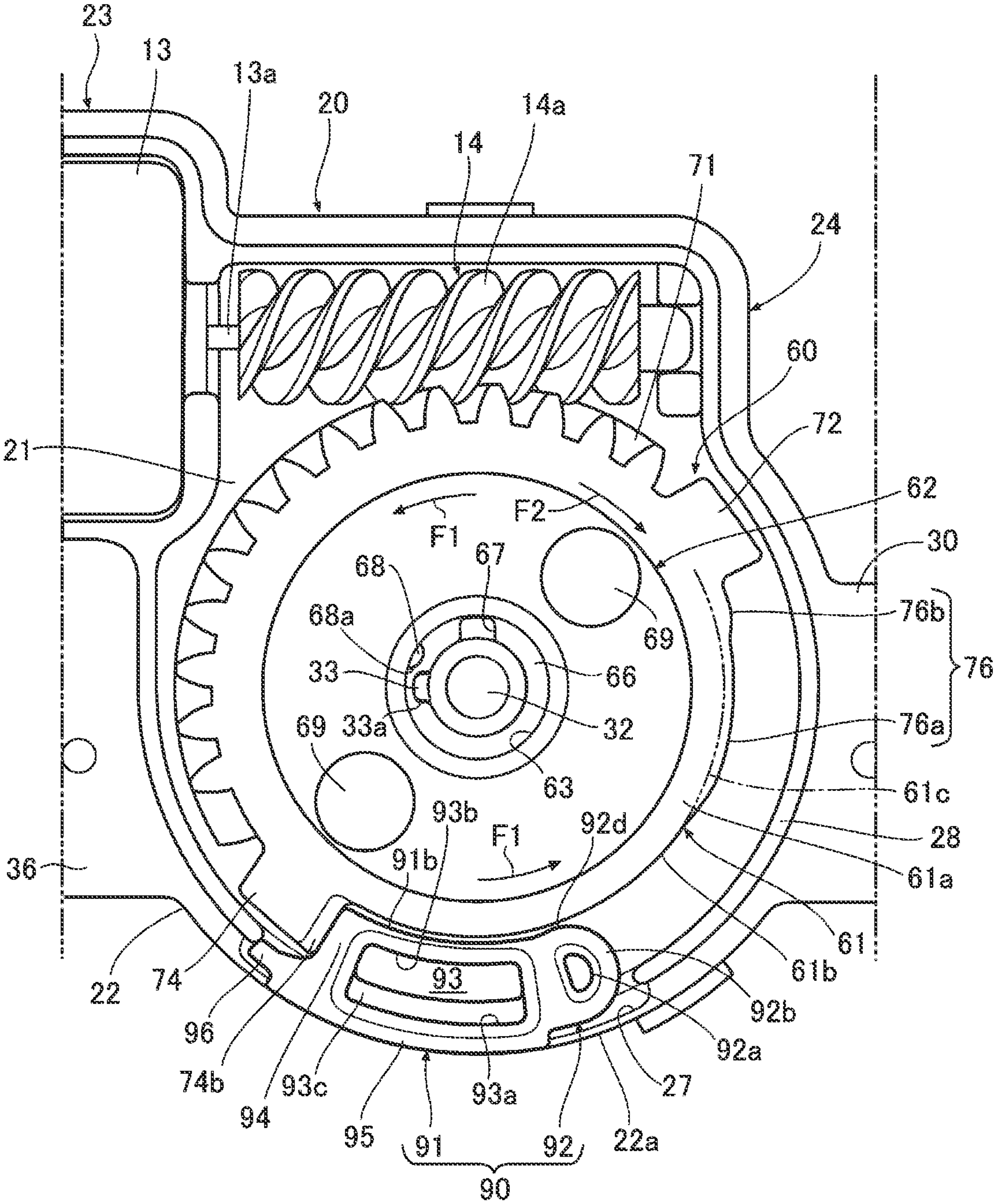
FIG. 12 is an illustration plan view illustrating an operation and an effect of the locking device and illustrating a state where the rotation body is not rotated.

In the present embodiment, a direction indicated by an arrow F1 in FIGS. 10, 12, and 19 means a rotation urging direction of the rotation body 60 caused by the torsion spring 12 serving as an urging member.

Figure 1A:
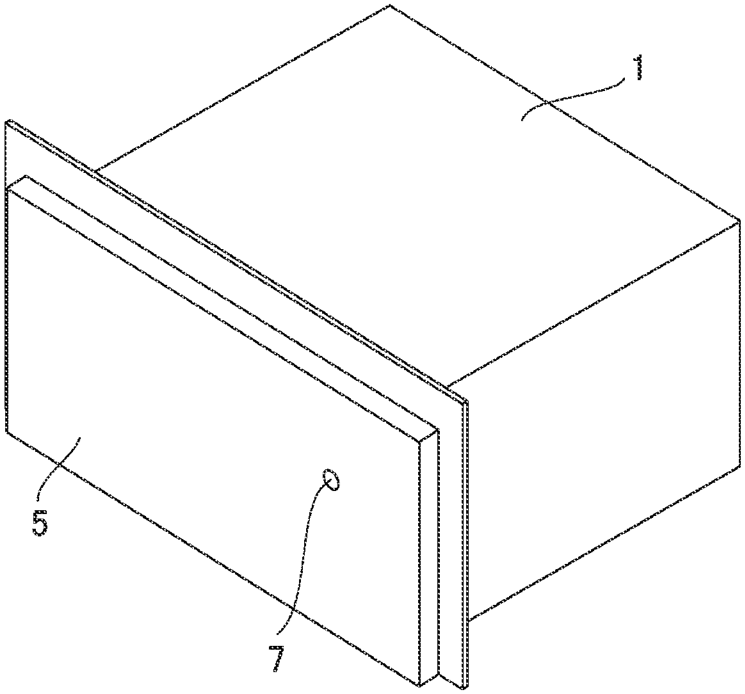

As illustrated in FIG. 1A, a switch 7 (a touch switch, a push button type switch, a lever type switch, or the like) for operating the motor 13 is disposed at a predetermined position on a front surface side of the opening and closing body 5.

The torsion spring 12 includes a winding portion 12_a_ formed by winding a wire, a first arm portion 12_b_ protruding inward from one circumferential end of the winding portion 12_a_, and a second arm portion 12_c_ protruding inward from the other circumferential end of the winding portion 12_a_.

On the other hand, the motor 13 is electrically connected to a power supply connector (not illustrated) via a pair of bus bars 17, 17, and a rotation shaft 13*a* of the motor 13 is rotated by an operation of the switch 7.

Figure 1B:
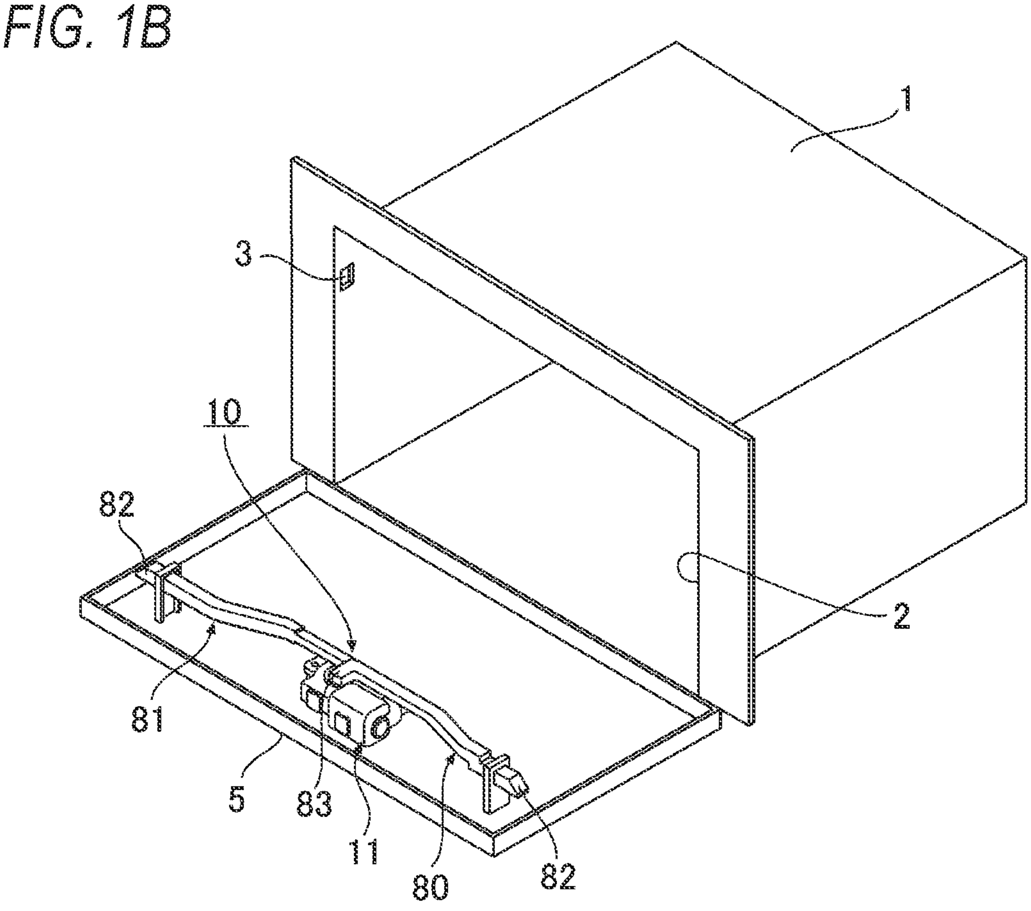

As illustrated in FIG. 1B, each of the locking members 80, 81 is formed in a rod shape having a bent portion in the middle in an axial direction, and an engaging portion 82 provided with a tapered surface is provided at a tip end portion in the axial direction, and the engaging portions 82, 82 are engaged with and disengaged from the pair of locking portions 3, 3, respectively, The engaging portions 82 may not be provided at the tip end portions of the locking members 80, 81, and may be provided in the middle in the axial direction.

In the present embodiment, the locking members 80, 81 are slidably disposed on the opening and closing body 5, and the locking portion 3 is formed on an opening portion 2 side of the fixed body 1. However, in contrast, the locking members may be slidably disposed on the fixed body side, and the locking portions may be provided on the opening and closing body side.

As illustrated in FIG. 19, base end portions 83, 83 of the pair of locking members 80, 81 are pivotally supported by the rotation body 60, and the pair of locking members 80, 81 are urged in a direction in which the engaging portions 82 on the tip end sides are engaged via the rotation body 60 that is rotationally urged by the torsion spring 12.

Next, the base 11 will be described in detail.

The base 11 is a case that accommodates the rotation body 60, the elastic member 90, and the motor 13 therein. The base 11 in the present embodiment includes a first case 20 and a second case 40 to be assembled to the first case 20.

Figure 2:
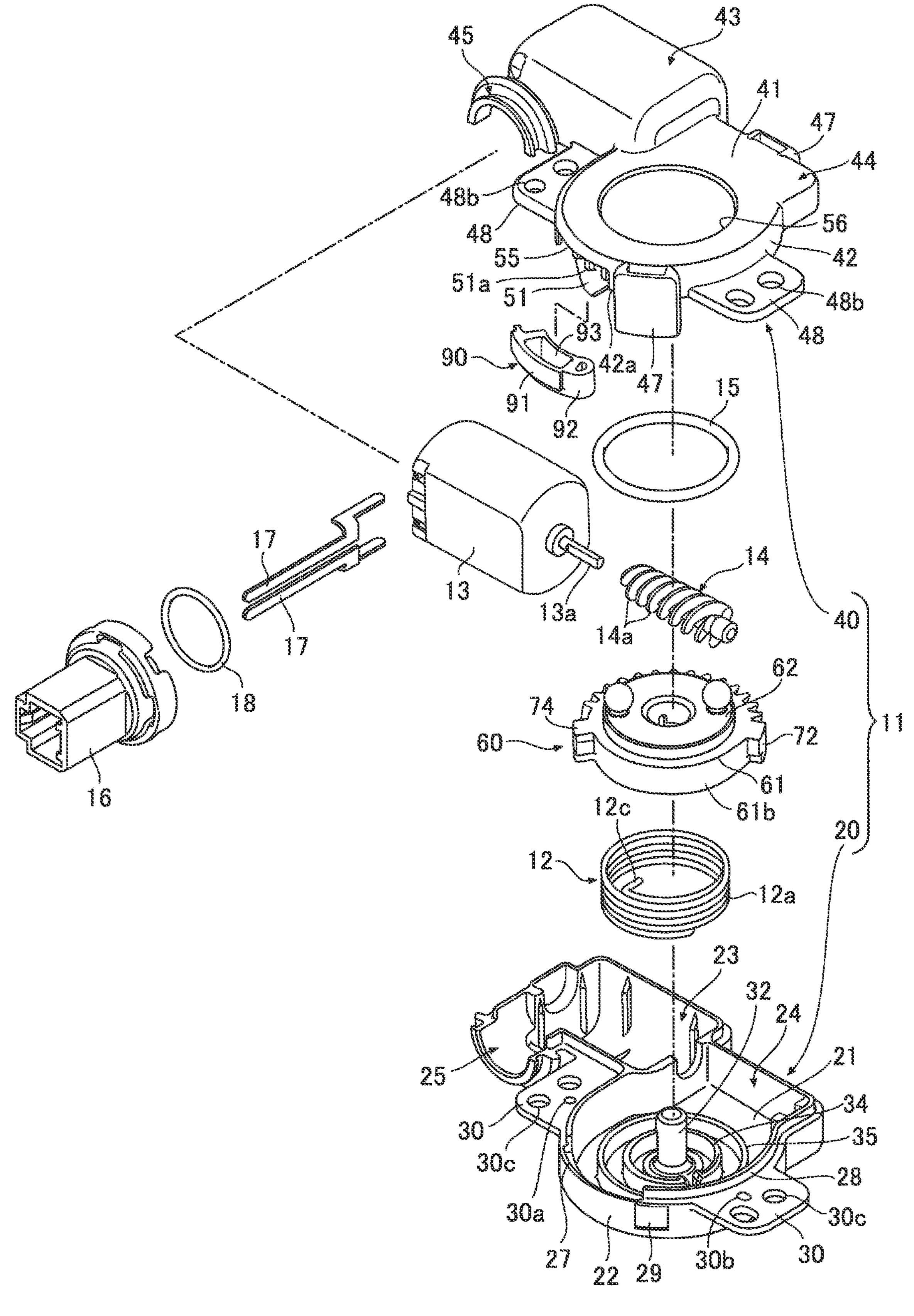
FIG. 2 is an exploded perspective view of the locking device.

As illustrated in FIG. 2, the first case 20 includes a bottom wall 21 and a peripheral wall 22 erected from a peripheral edge of the bottom wall 21, and is formed in a bottomed frame shape having an opening on a surface side (upper side) facing the second case 40.

Figure 5:
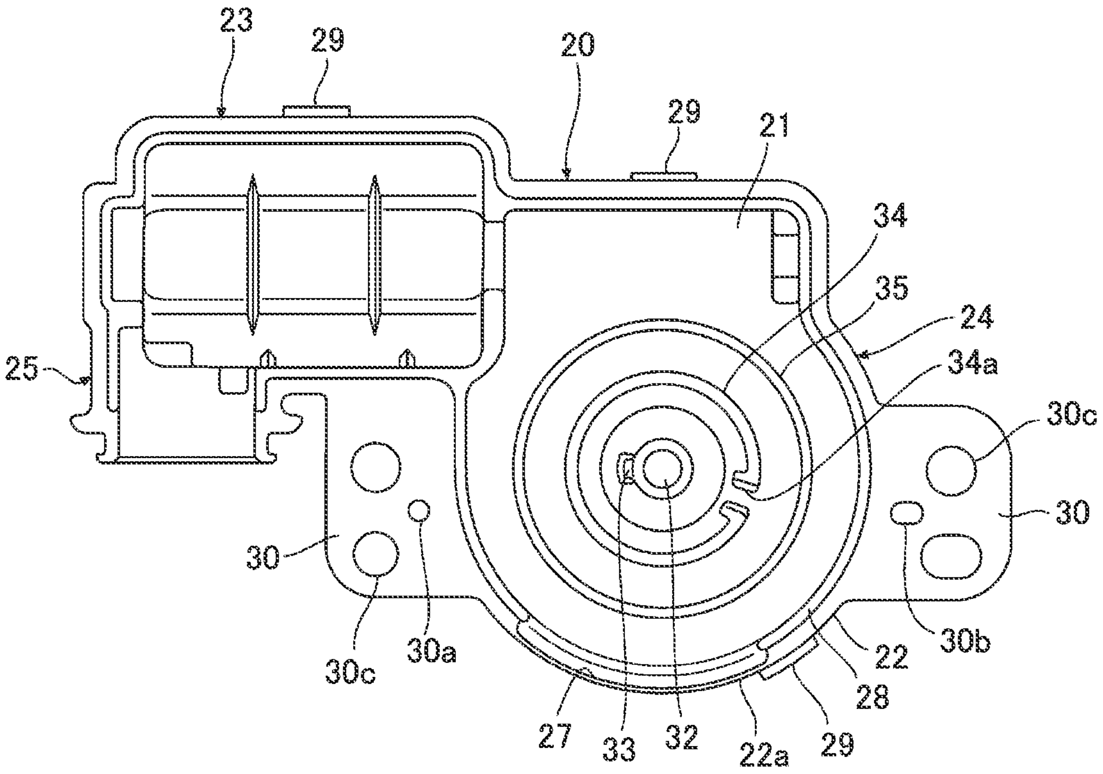
FIG. 5 is a plan view of a first case of a base of the locking device.

Also referring to FIG. 5, the first case 20 includes a motor arrangement portion 23 in which the motor 13 is to be disposed, and a gear arrangement portion 24 which is provided. adjacent to the motor arrangement portion 23 on a rotation shaft 13*a* side (see FIG. 10) of the motor 13 and in which the worm 14 and the rotation body 60 are to be disposed. A connector insertion portion 25 into which the power supply connector (not illustrated) for supplying electricity to the motor 13 is to be inserted is provided on one side portion of the motor arrangement portion 23 of the first case 20. A portion of the peripheral wall 22 on a gear arrangement portion 24 side, which is on a side opposite to an arrangement location of the worm 14, is formed in a curved surface shape.

As illustrated in FIGS. 2 and 5, an elastic member arrangement recessed portion 27 having a recessed groove shape is formed at a predetermined depth from an upper end portion (an end portion on a surface side facing the second case 40) in a predetermined range along the circumferential direction of the curved portion of the peripheral wall 22 on the gear arrangement portion 24 side, which is on the side opposite to the arrangement location of the worm 14. A part of the elastic member 90 is accommodated in the elastic member arrangement recessed portion 27. As illustrated in FIG. 10, a peripheral edge portion of one circumferential end portion of the elastic member arrangement recessed portion 27 at the peripheral wall on the gear arrangement portion 24 side forms a wall portion 22*a* disposed at a position facing an outer periphery of the rotation body 60.

As illustrated in FIG. 2, a rib-shaped inner wall portion 28 protrudes from an end portion of the peripheral wall 22 of the first case 20 on the surface side facing the second case 40, and the inner wall portion 28 surrounds a peripheral edge portion of the gear arrangement portion 24 excluding the elastic member arrangement recessed portion 27 and a peripheral edge portion of the motor arrangement portion 23 excluding the connector insertion portion 25. In addition, a plurality of engaging protrusions 29 for assembling to the second case 40 protrude from predetermined locations on an outer periphery of the peripheral wall 22.

A pair of mounting flanges 30, 30 respectively project from predetermined locations of the end portion of the peripheral wall 22 on the surface side facing the second case 40. A round hole 30*a* is formed in one mounting flange 30, and an elongated hole 30*b* is formed in the other mounting flange 30. Further, a plurality of mounting holes 30*c* for mounting onto the opening and closing body 5 are formed in each of both the mounting flanges 30, 30.

Figure 9:
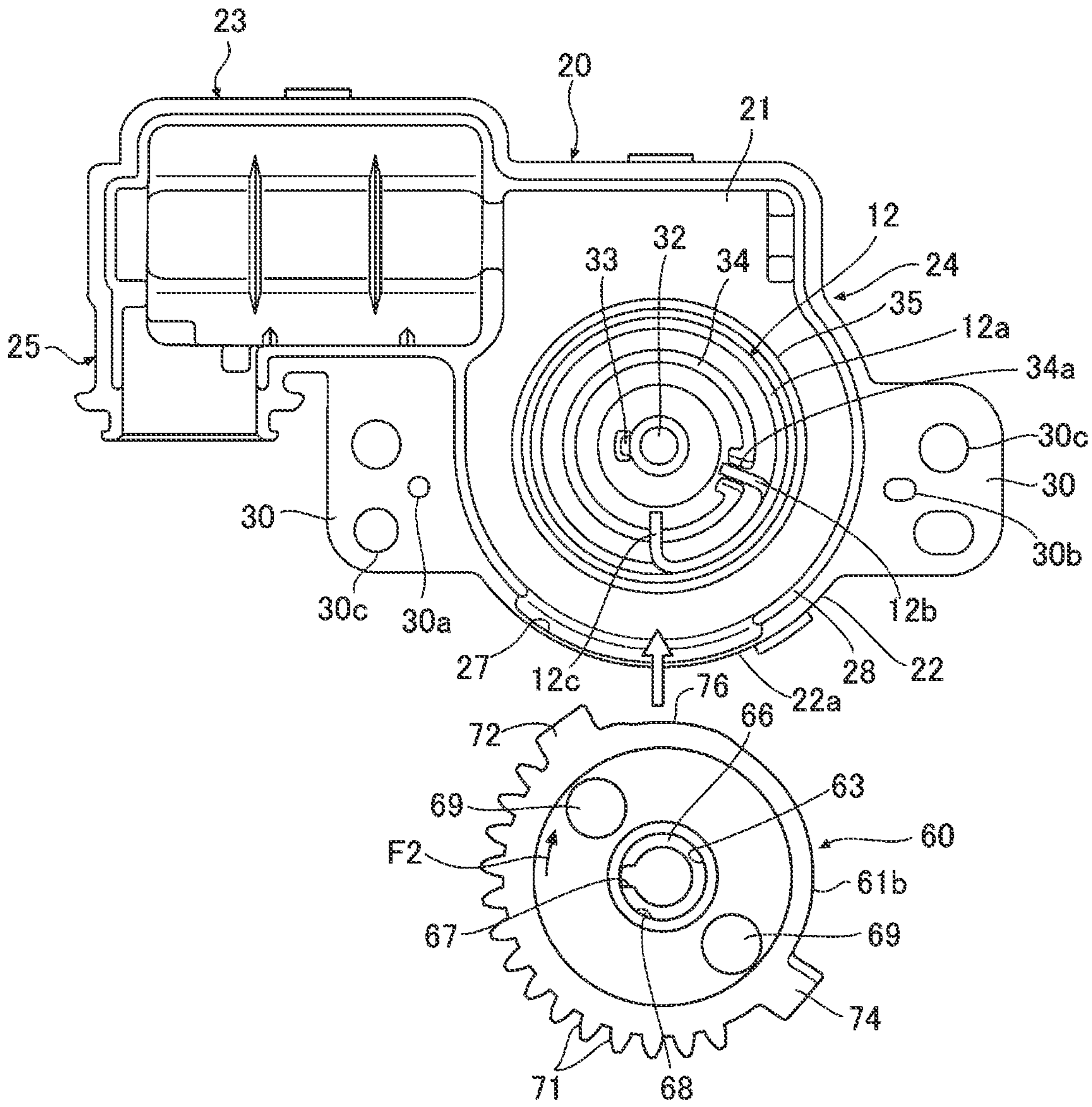
FIG. 9 is a plan view illustrating a relationship between the first case of the base and the rotation body in the locking device.

A substantially cylindrical support shaft 32 that rotatably supports the rotation body 60 protrudes from the bottom wall 21 on the gear arrangement portion 24 side. One projection portion 33 protrudes from an outer periphery of a tip end portion of the support shaft 32 in a protruding direction (see FIG. 3). Further, a substantially C-shaped spring locking wall portion 34 is provided on the outer periphery of the support shaft 32 of the bottom wall 21, and the spring locking wall portion 34 is provided with a spring locking groove 34*a* having a cutout groove shape at one location in the circumferential direction. The first arm portion 12*b* of the torsion spring 12 is locked to the spring locking groove 34*a* of the spring locking wall portion 34 (see FIG. 9). An annular spring holding wall portion 35 is provided on an outer periphery of the spring locking wall portion 34 of the bottom wall 21. As illustrated in FIG. 9, the winding portion 12*a* of the torsion spring 12 is disposed and held inside the spring holding wall portion 35.

On the other hand, the second case 40 to be mounted on the first case 20 is formed in a frame shape that includes a ceiling wall 41 and a peripheral wall 42 vertically provided from a peripheral edge of the ceiling wall 41 and that has an opening on a surface side (lower side) facing the first case 20.

Figure 3:
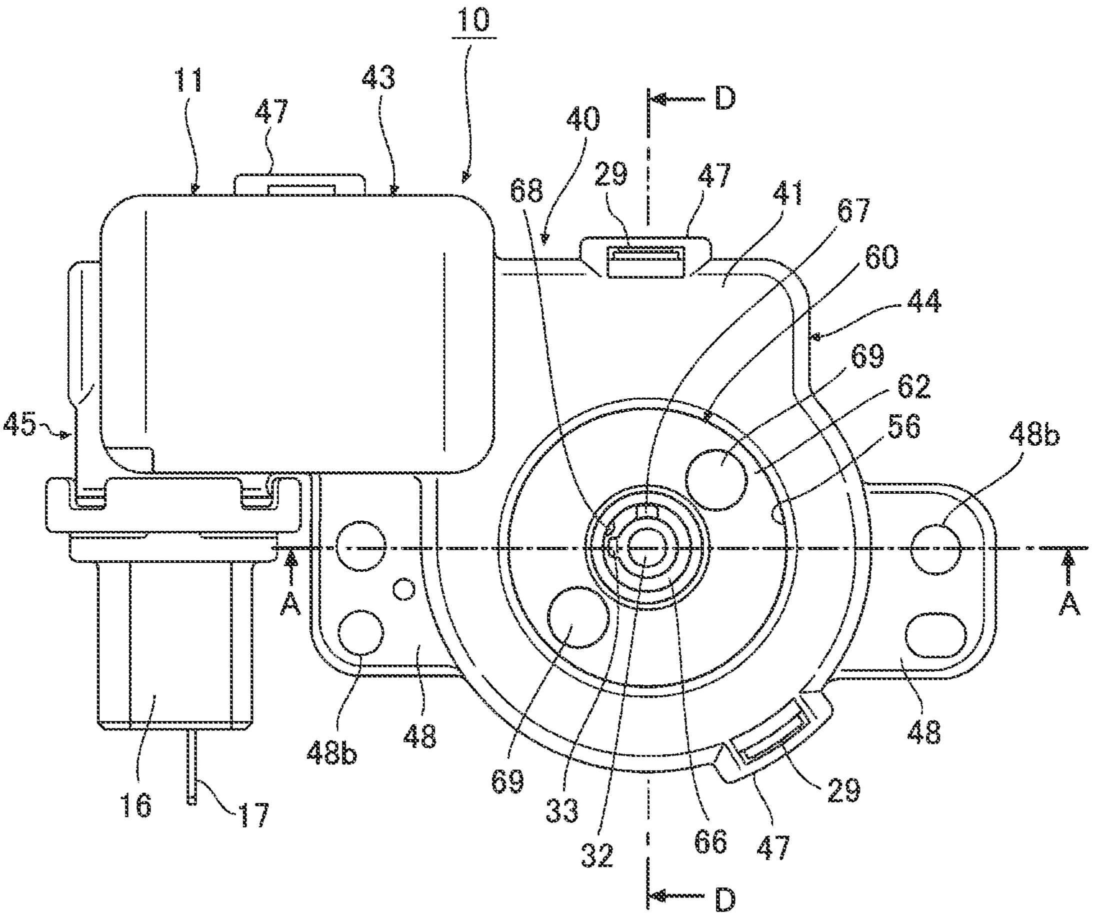
FIG. 3 is a plan view of the locking device.

As illustrated in FIGS. 2 and 3, in the second case 40, a motor arrangement portion 43, a gear arrangement portion 44, and a connector insertion portion 45 are provided at positions respectively corresponding to the motor arrangement portion 23, the gear arrangement portion 24, and the connector insertion portion 25 of the first case 20, respectively. A portion of the peripheral wall 42 on a gear arrangement portion 44 side, which is on a side opposite to an arrangement location of the worm 14, is formed in a curved surface shape.

Figure 4A:
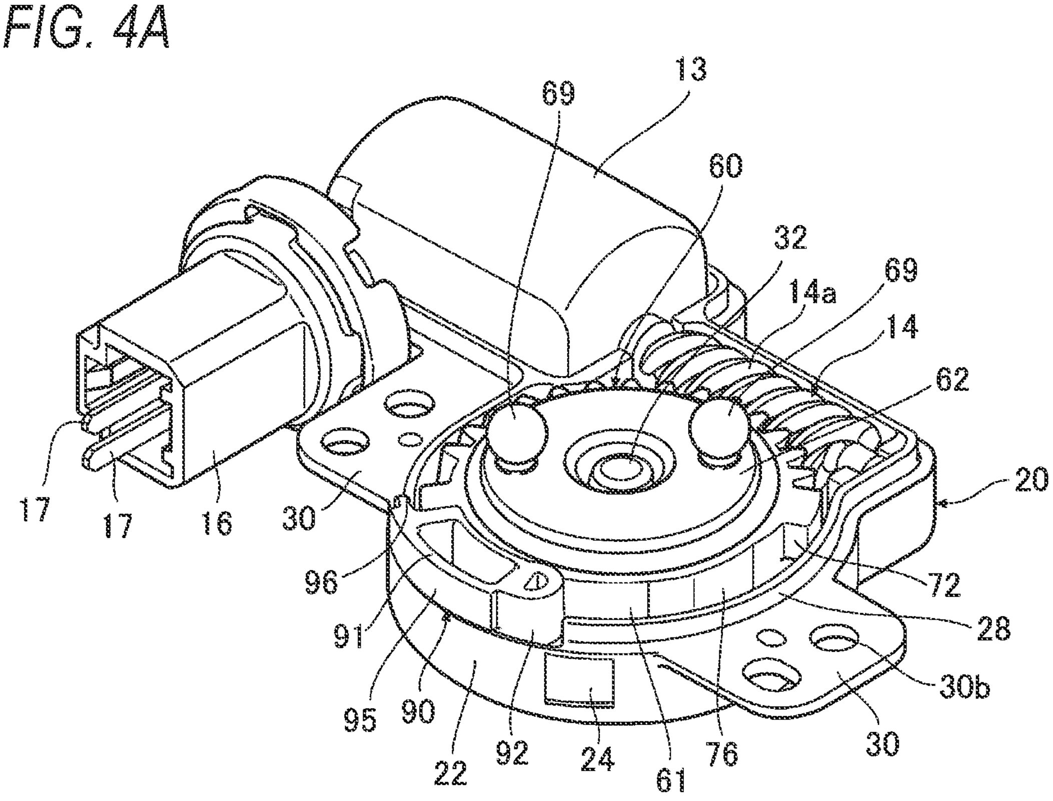
FIG. 4A is a perspective view of the locking device in a state where a second case is removed.
Figure 4B:
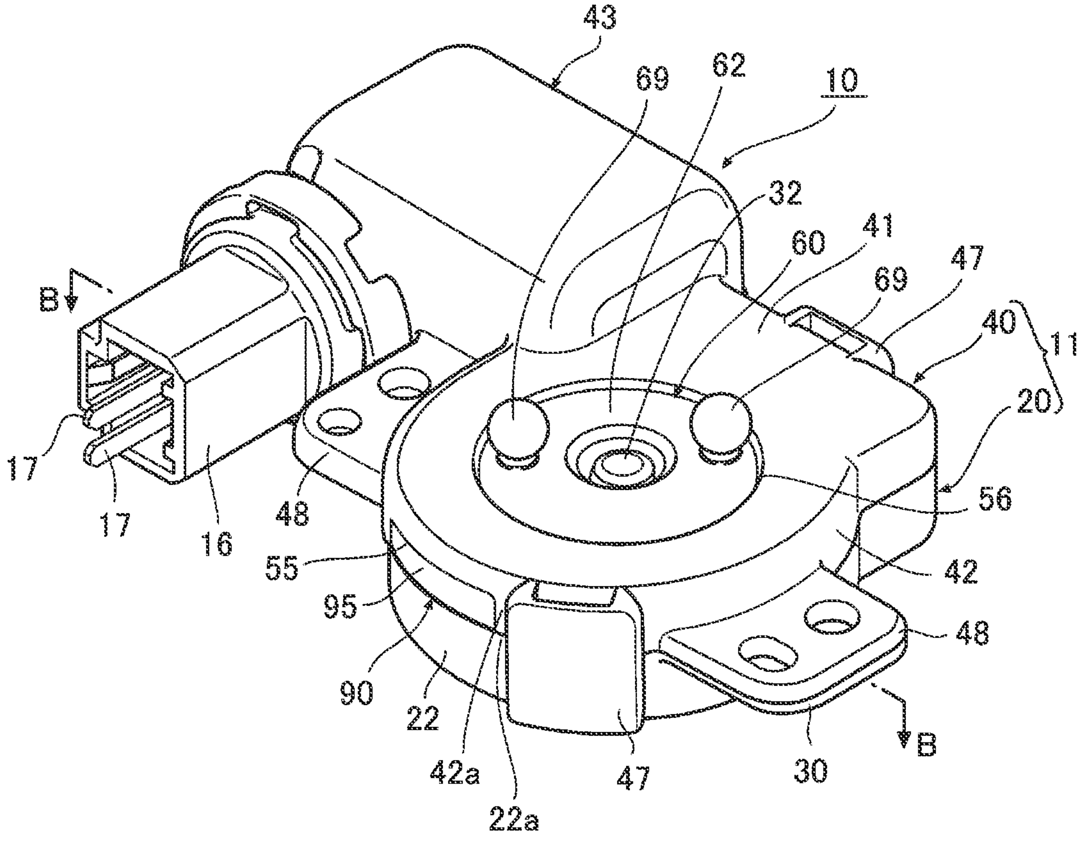
FIG. 4B is a perspective view of the locking device.

A plurality of engaging pieces 47 are vertically provided at positions respectively corresponding to the plurality of engaging protrusions 29 of the first case 20 on an outer periphery of the peripheral wall 42. By engaging the plurality of engaging pieces 47 with the plurality of engaging protrusions 29, the second case 40 is assembled to the first case 20, and the base 11 which is a case is configured, as illustrated in FIG. 3 and FIG. 4B. Inside the base 11, an arrangement space for the motor 13 is provided by the motor arrangement portions 23, 43, an arrangement space for the worm 14 and the rotation body 60 is provided by the gear arrangement portions 24, 44, the power supply connector (not illustrated) is inserted into the connector insertion portions 25, 45, and a connector insertion portion is provided thereby.

A tubular connector case 16, which is separate from the base 11, is assembled to the above-described connector insertion portion (see FIG. 2). A pair of bus bars 17, 17 and a seal ring 18 are disposed in the connector case 16, and the power connector (not illustrated) for supplying electricity to the motor 13 is inserted into the connector case 16.

Figure 11A:
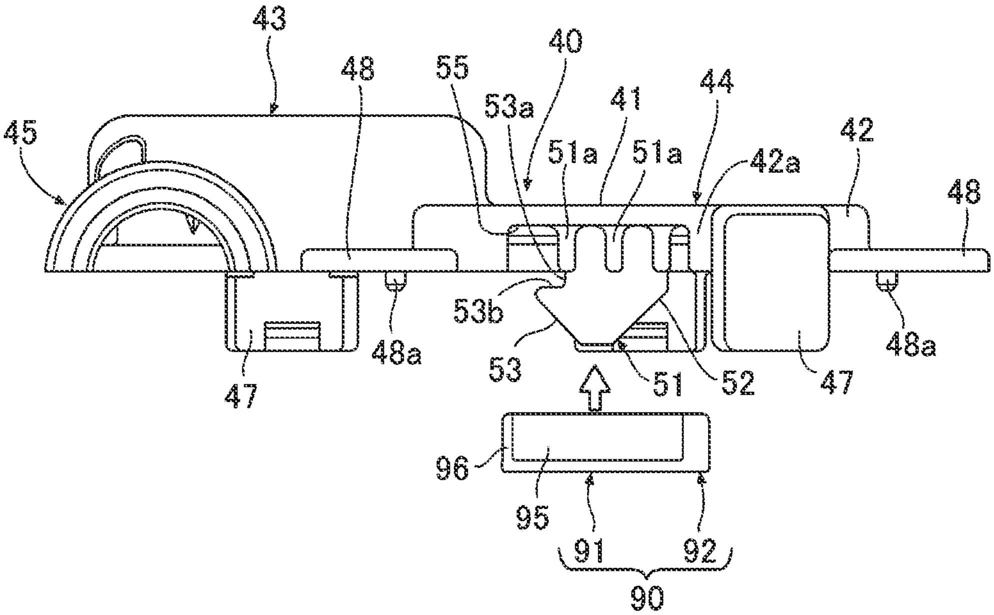
Figure 11B:
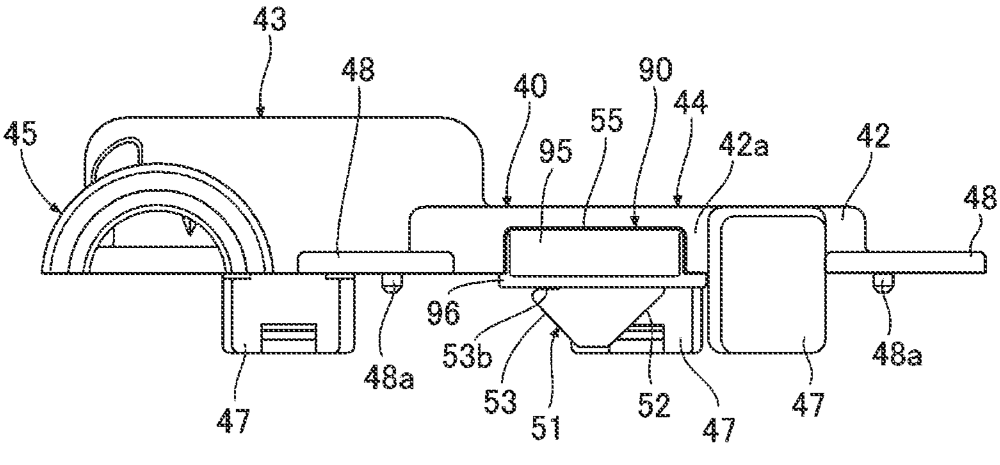

In addition, a pair of mounting flanges 48, 48 project from positions corresponding to the pair of mounting flanges 30, 30 of the first case 20 at a lower end portion (an end portion on the surface side facing the first case 20) of the peripheral wall 42. As illustrated in FIGS. 11A and 11B, a positioning pin 48*a* protrudes from an inner surface of each mounting flange 48. When the second case 40 is to be assembled to the first case 20, one positioning pin 48*a* is fitted into the round hole 30*a*, and the other positioning pin 48*a* is inserted into the elongated hole 30*b* in a displaceable manner, so that dimensional errors and the like of both cases 20, 40 are appropriately corrected, and the assembly is performed. As illustrated in FIG. 2, a plurality of mounting holes 48*b* for mounting onto the opening and closing body 5 are formed in each of both the mounting flanges 48, 48.

As illustrated in FIG. 2 and FIG. 11A, a support portion 51 protrudes from an inner side of the curved portion of the peripheral wall 42 on the gear arrangement portion 44 side, which is on a side opposite to the arrangement location of the worm 14, and from a position of the ceiling wall 41 which is to be aligned with the elastic member arrangement recessed portion 27 provided in the first case 20.

The support portion 51 is formed in the form of a wide projecting piece extending in a curved surface shape along a circumferential direction of the peripheral wall 42. The support portion 51 is inserted into a support hole 93 (see FIG. 7A), which will be described later, of the elastic member 90. Further, as illustrated in FIGS. 11A and 11B, tapered surfaces 52, 53 that taper the support portion 51 are formed on both outer side surfaces in a width direction on a tip end portion side of the support portion 51 in the protruding direction.

A locking step portion 53*b* is formed, via a cutout 53*a*, on a base end side of the tapered surface 53 located on a side opposite to a wall portion 42*a*, which will be described. later. The locking step portion 53*b* is locked to a back peripheral edge of the support hole 93 of the elastic member 90.

Further, as illustrated in FIG. 2 and FIG. 11A, a plurality of ribs 51*a*, are provided at predetermined intervals on an outer surface on a base end portion side of the support portion 51. The plurality of ribs 51*a* abut against an inner surface 93*a* (see FIG. 7B) of a diameter-increased portion of the support hole 93 of the elastic member 90.

A cutout portion 55 is formed on an outer periphery of the case at a position facing the support portion 51 to which the base portion 91 of the elastic member 90 is to be locked. In the case of the present embodiment, the cutout portion 55 that is cut out in an arc shape along the peripheral wall 42 is formed at a position, facing the support portion 51 of the curved portion of the peripheral wall 42 on the gear arrangement portion 44 side of the second case 40, which is on the side opposite to the arrangement location of the worm 14.

As illustrated in FIG. 4B, FIGS. 11A and 11B, a peripheral edge portion of one circumferential end of the cutout portion 55 at the peripheral wall on the gear arrangement portion 44 side forms a wall portion 42*a* disposed at a position facing the outer periphery of the rotation body 60.

Figure 17:
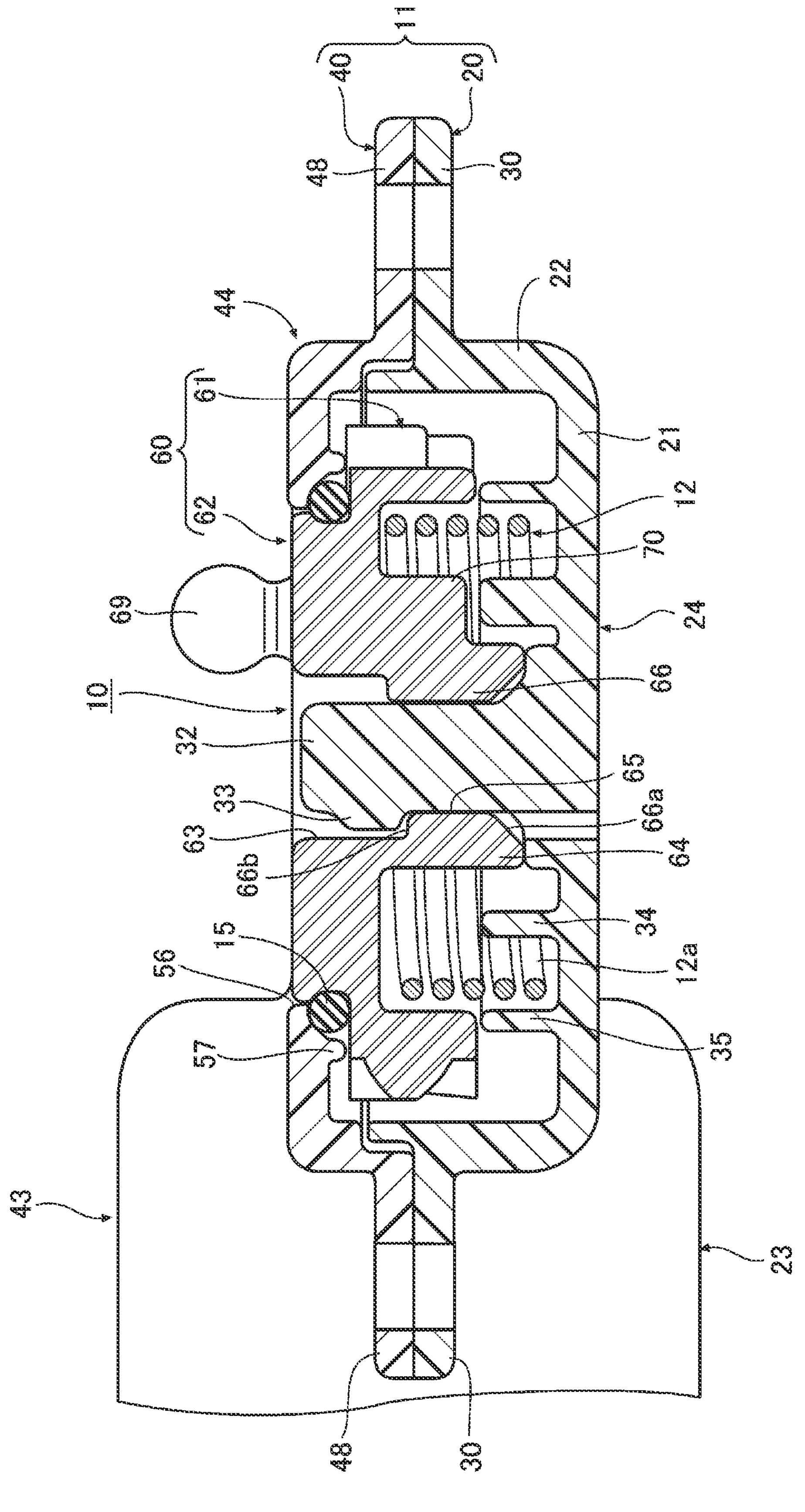
FIG. 17 is a cross-sectional view taken along a line A-A of FIG. 3.

As illustrated in FIG. 2, a circular opening portion 56 is formed in the ceiling wall 41 on the gear arrangement portion 44 side, and allows a rotation unit 62, which will be described later, of the rotation body 60 to protrude. As illustrated in FIG. 17, a rib 57 protrudes from a peripheral edge, excluding the support portion 51, of a back side (inner space side of the case) of the opening portion 56.

The base described above includes the pair of cases 20, 40, but may be a single member. In addition, the shape and the structure of each portion (the bottom wall, the peripheral wall, the engaging protrusion, the engaging piece, the mounting flange, the cutout portion, and the like) of the base and each case are not limited to the above aspect. The support portion 51 for supporting the elastic member 90 protrudes from the second case 40 side, but the support portion 51 may protrude from the first case 20 side. In addition, the shape and the structure of the support portion are not limited to the above aspect either Next, the rotation body 60 will be described in detail.

Figure 6A:
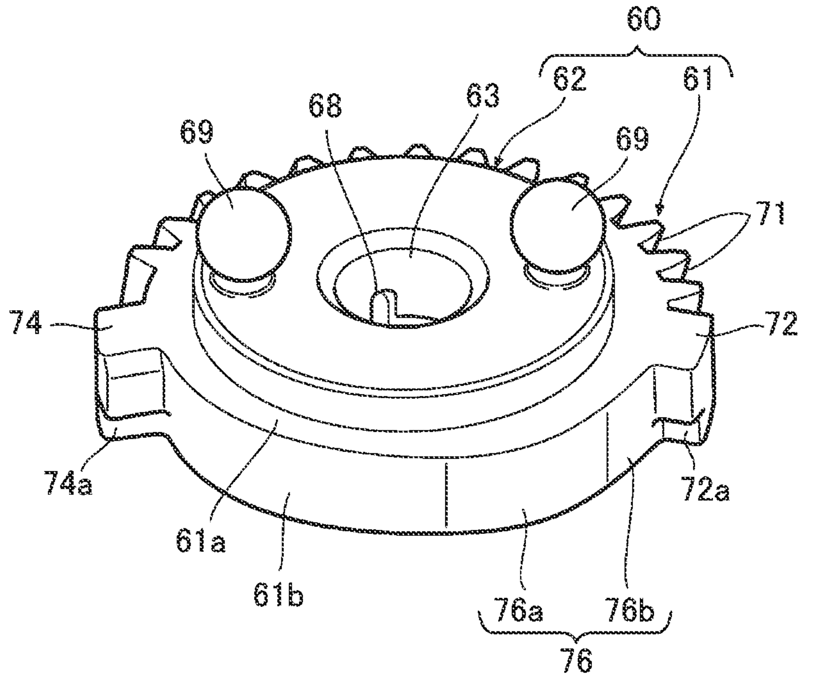
FIGS. 6A and 6B are perspective views of a rotation body of the locking device.
Figure 6B:
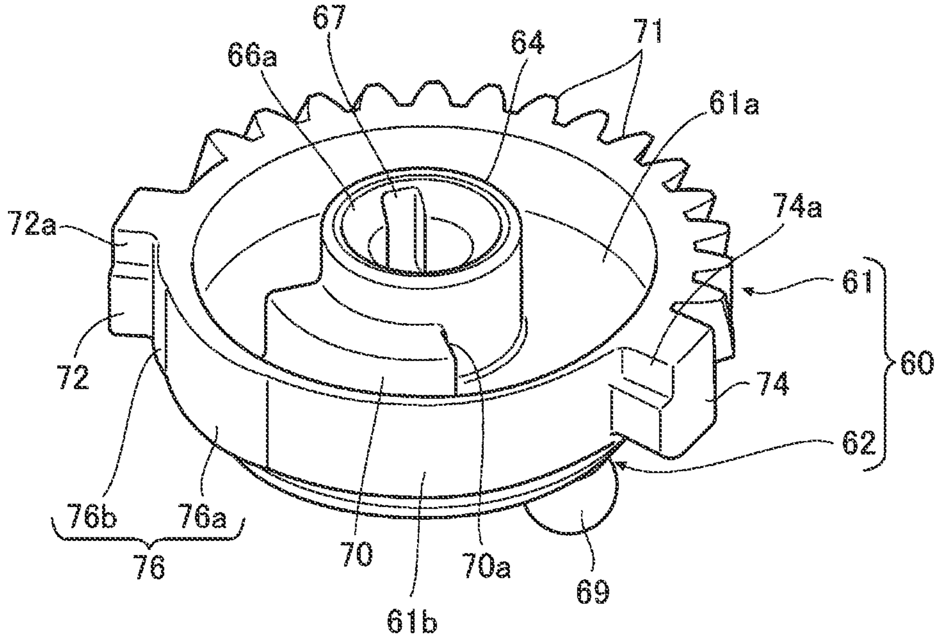

As illustrated in FIGS. 2, 6A and 6B, the rotation body 60 of the present embodiment includes a gear portion 61 having a substantially cylindrical frame shape with an opening at the lower side and including a ceiling wall 61*a* and a substantially cylindrical peripheral wall 61*b* vertically provided from a peripheral edge of the ceiling wall 61*a* and the rotation unit 62 coaxially connected to the gear portion 61 and having a diameter smaller than that of the gear portion 61.

An O-shaped seal ring 15 is mounted on an outer periphery of the rotation unit 62 to seal a gap between the opening portion 56 of the second case 40 and the rotation body 60 as illustrated in FIG. 17.

As illustrated in FIG. 17, a shaft hole 63 is formed through a radial center of the rotation unit 62 and the ceiling wall 61*a* of the gear portion 61. Further, as illustrated in FIGS. 6A, 6B and 17, a tubular portion 64 having a substantially cylindrical shape protrudes from a peripheral edge of the shaft hole 63 on a back surface side of the ceiling wall 61*a* of the gear portion 61. An inner protruding portion 66 having a substantially C-shape protrudes from an inner circumferential surface of the tubular portion 64. The inner protruding portion 66 is provided with an axial cutout 67 formed by cutting out along the axial direction of the tubular portion 64 at a part in the circumferential direction. The projection portion 33 provided on the support shaft 32 can be inserted into the axial cutout 67. The inner protruding portion 66 is formed in a range from an axially lower end portion (an end portion facing the bottom wall 21 of the first case 20) of the tubular portion 64 to a middle location in the axial direction (see FIG. 17).

Figure 18:
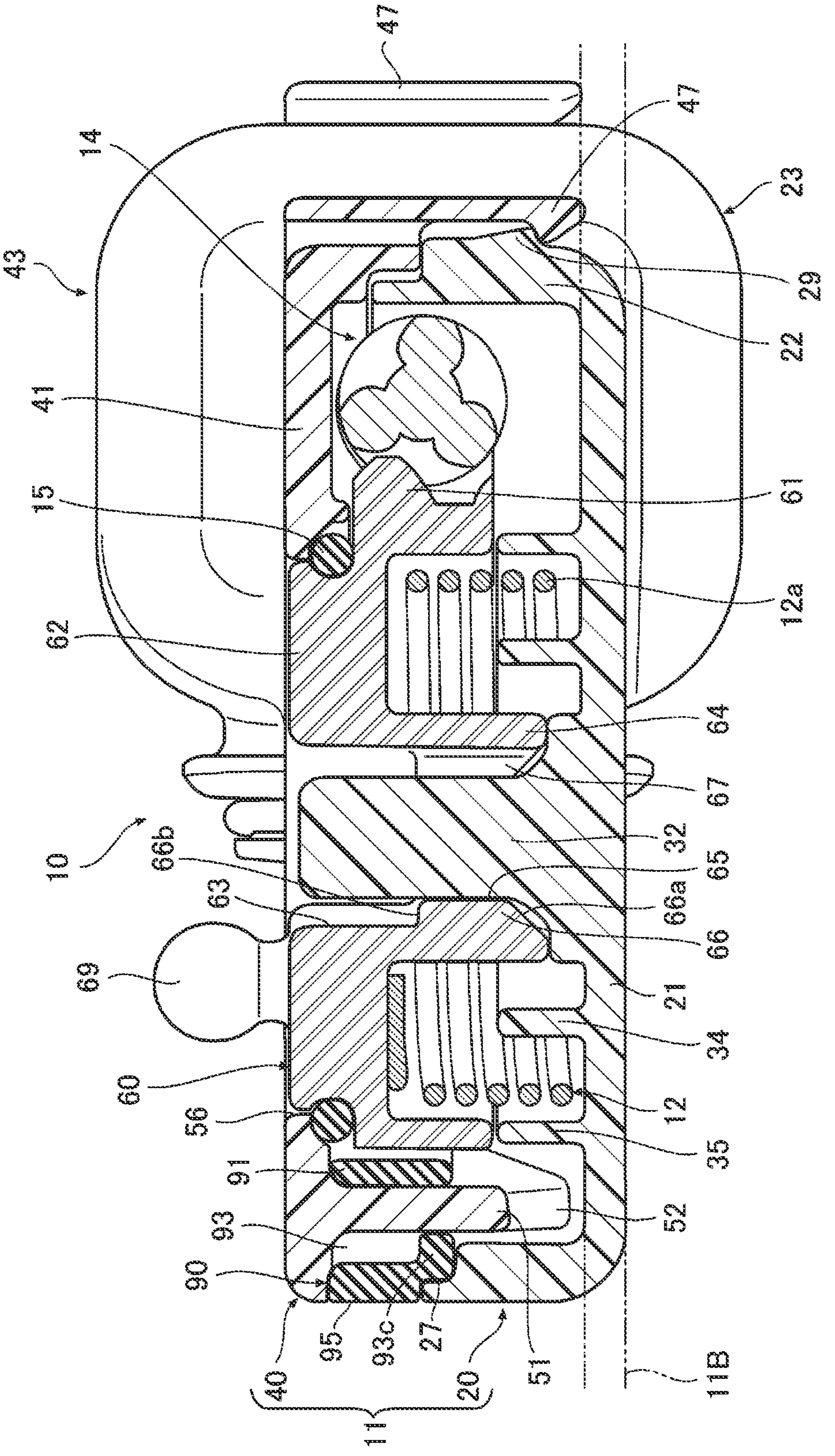
FIG. 18 is a cross-sectional view taken along a line D-D of FIG. 3.

An inner portion of the inner protruding portion 66 of the tubular portion 64 and an inner portion of the shaft hole 63 form a support hole 65 (see FIGS. 17 and 18). The support shaft 32 provided in the first case 20 is inserted into the support hole 65, so that the rotation body 60 is rotatably supported by the first case 20.

As a result, the rotation body 60 is rotatably accommodated in the first case 20 of the base 11. However, the rotation body 60 may be placed on the base 11, That is, FIG. 18 shows a base 11B simply having a plate shape rather than a case shape (refer to a two-dot chain line in FIG. 18), and in this case, the rotation body 60 is placed on the base 11B.

In the present embodiment, the support shaft 32 is provided in the first case 20 of the base 11, the shaft hole 63 and the tubular portion 64 into which the support shaft 32 can be inserted are provided in the rotation body 60, so that the rotation body 60 is rotatably accommodated and held in the first case 20, However, a support shaft may be provided in, for example, the second case 40, and the rotation body 60 may be accommodated and held in the second case 40. Further, the support shaft may be provided in a rotation body rather than a base, and a support hole into which the support shaft can be inserted or the like may be provided in the base, so that the rotation body may be rotatably accommodated in the base or placed on the base.

An inner diameter of the shaft hole 63 is formed to be larger than an outer diameter of the tip end portion of the support shaft 32 including the projection portion 33 (see FIG. 17), and the support shaft 32 including the projection portion 33 can be received in the shaft hole 63.

Further, a guide surface 66*a* having a mortar shape is formed on a lower end surface of the inner protruding portion 66 (see FIGS. 17 and 18), so that the support shaft 32 can be easily inserted when the support shall 32 is inserted from a lower end opening of the tubular portion 64. An upper end of the inner protruding portion 66 is provided with a stepped locking surface 66*b* that can be locked by the projection portion 33 provided on the support shaft 32 (in FIG. 17, the locking surface 66*b* is separated from the projection portion 33, but when an external force is applied in a direction in which the rotation body 60 is separated from the bottom wall 21 of the first case 20, the projection portion 33 is engaged with the locking surface 66*b*).

As illustrated in FIG. 17, an inner diameter of the inner protruding portion 66 is smaller than the inner diameter of the shaft hole 63 and the outer diameter of the tip end portion of the support shaft 32 including the projection portion 33, and is adapted to the outer diameter of the support shaft 32. Therefore, as illustrated in FIG. 17, in a state where the support shaft 32 is inserted into the support hole 65, the projection portion 33 of the support shaft 32 overlaps with the inner protruding portion 66 in the radial direction and faces the locking surface 66*b*, and the rotation body 60 is rotatably supported by the support shaft 32 in a state where rattling is reduced.

The axial cutout 67 of the rotation body 60 is aligned with the projection portion 33 of the support shaft 32 (see FIG. 9), the support shaft 32 is inserted from the lower end opening of the tubular portion 64, and the projection portion 33 is inserted out from an upper opening of the axial cutout 67. Then, the rotation body 60 is rotated in a direction indicated by an arrow F2 (a direction opposite to the rotation urging direction of the torsion spring 12) against a rotation urging force of the torsion spring 12, so that the projection portion 33 is displaced in the circumferential direction with respect to the axial cutout 67, and thus the rotation body 60 can be retained and held with respect to the support shaft 32.

As illustrated in FIG. 9, a projection portion 68 protrudes from a lower position of the shaft hole 63 (a position on the inner protruding portion 66 side), which is a predetermined location in the circumferential direction of the inner circumferential surface of the shaft hole 63. A base end side of the projection portion 68 is coupled to an engaging surface 66*b* of the inner protruding portion 66. In addition, the projection portion 68 approaches and separates from the projection portion 33 of the support shaft 32.

As illustrated in FIG. 6A, a pair of pivotally supporting portions 69, 69 whose tip ends protrude in a spherical shape are provided on a surface of the rotation unit 62 (a surface on the opening portion 56 side of the second case 40) at locations facing a rotation center of the rotation unit 62 (positions coinciding with an axial center of the shaft-shaped support shaft 32). The pair of pivotally supporting portions 69, 69 are inserted into the base end portions 83, 83 of the pair of locking members 80, 81 in a retained state, and the base end portions 83, 83 of the pair of locking members 80, 81 are pivotally supported at locations facing the rotation center of the rotation unit 62. As a result, the pair of locking members 80, 81 slide in mutually opposite directions in synchronization with each other when the rotation body 60 rotates (see FIG. 20).

As illustrated in FIG. 6B, a locking portion 70 having a substantially fan shape protrudes from a back surface side of the ceiling wall 61*a* of the gear portion 61, and a narrow base end portion side of the locking portion 70 is coupled to an outer periphery of the tubular portion 64. In addition, the second arm portion 12*c* of the torsion spring 12, which is an urging member, is locked to one side surface 70*a* of the locking portion 70 in the circumferential direction. As described above, the first arm portion 12*b* of the torsion spring 12 is locked to the spring locking groove 34*a* provided in the first case 20, and the rotation body 60 is rotatably supported by the support shaft 32 in a state where the first arm portion 12*b* and the second arm portion 12*c* are separated from each other. Therefore, the rotation body 60 is rotationally urged in a direction in which the second arm portion 12*c* approaches the first arm portion 12*b* of the torsion spring 12, that is, in a direction of the arrow F1 in FIGS. 10 and 19, and the engaging portions 82, 82 of the pair of locking members 80, 81 are urged in a direction in which the engaging portions 82, 82 are engaged with the locking portions 3, 3.

As illustrated in FIGS. 2, 6A and 6B, teeth 71 for meshing with the teeth 14*a* of the worm 14 are formed in a predetermined range along the circumferential direction on an outer peripheral surface of the peripheral wall 61*b* of the gear portion 61. Accordingly, when the worm 14 rotates via the motor 13, the rotation body 60 provided with the teeth 71 that mesh with the teeth 14*a* of the worm 14 rotates against the rotation urging force of the torsion spring 12. As illustrated in FIG. 12, when viewed in the axial direction of the rotation body 60, the teeth 71 in the present embodiment are formed in a range from an outer surface of the peripheral wall 61*b* close to the one pivotally supporting portion 69 to an outer surface of the peripheral wall 61*b* close to the other pivotally supporting portion 69.

Further, the rotation body 60 is provided with a protruding portion on a part of an outer periphery thereof. In the present embodiment, as illustrated in FIG. 12, when viewed in the axial direction of the rotation body 60, a first protruding portion 72 protrudes from a position close to one circumferential end portion of the teeth 71 on the outer circumferential surface of the peripheral wall 61*b* of the gear portion 61, and a second protruding portion 74 protrudes from a position close to the other circumferential end portion of the teeth 71 on the outer circumferential surface of the peripheral wall 61*b*.

As illustrated in FIG. 12, in a state where the motor 13 does not operate, and the worm 14 is not rotating, the second protruding portion 74 of the rotation body 60, which is rotationally urged by the rotation urging force of the torsion spring 12, abuts against an abutting portion 94, which will be described later, of the elastic member 90, and a rotational position of the rotation body 60 is restricted. As illustrated in FIG. 15, When the motor 13 operates and the worm 14 rotates to rotate the rotation body 60 maximally in a direction opposite to the rotation urging direction (see arrow F2 in FIGS. 12 to 14) against the rotation urging force of the torsion spring 12, the first protruding portion 72 of the rotation body 60 abuts against the stopper portion 92, which will be described later, of the elastic member 90, and the rotational position of the rotation body 60 is restricted. That is, the first protruding portion 72 is one example of a "protruding portion" according to the present invention.

As illustrated in FIGS. 2, 6A and 6B, cutouts 72*a*, 74*a* are respectively formed on abutting surfaces with the elastic member 90, which are side surfaces of the first protruding portion 72 and the second protruding portion 74 separated from the teeth 71.

Further, as illustrated in FIGS. 6A, 6B and 12, a sliding contact portion 76 is provided on a part of the outer periphery of the rotation body 60, and the sliding contact portion 76 is in sliding contact with the elastic member 90 (in this case, in sliding contact with the stopper portion 92 of the elastic member 90) in a process in which the protruding portion (the first protruding portion 72) approaches the stopper portion 92 of the elastic member 90. Further, the sliding contact portion 76 has a shape extending along the outer periphery of the rotation body 60.

The sliding contact portion 76 will be described in detail in FIG. 12, an imaginary outer circumferential surface 61*c* of the peripheral wall 61*b* (a circumferential surface when the peripheral wall 61*b* is extended with a certain diameter) is indicated by a two-dot chain line. As illustrated in FIG. 12, the sliding contact portion 76 in the present embodiment includes a first sliding contact portion 76*a* that bulges from a position, closer to the first protruding portion 72, on the peripheral wall 61*b* of the gear portion 61 between the first protruding portion 72 and the second protruding portion 74 such that a substantial arc shape is formed toward the outer diameter direction from the imaginary outer circumferential surface 61*c* of the peripheral wall 61*b*, and a second sliding contact portion 76*b* that protrudes from a terminal end of the first sliding contact portion 76*a* toward the first protruding portion 72 in a manner of being gradually higher in the outer diameter direction and further higher than the first sliding contact portion 76*a*.

The rotation body described above is not limited to the shape and the structure described above, and may have a shape and a structure including at least the protruding portion and the sliding contact portion. In addition, the rotation body 60 in the present embodiment includes the pair of protruding portions 72, 74, but may include an abutting portion that abuts against a stopper portion of an elastic member.

Next, the elastic member 90 will be described in detail.

Figure 7A:
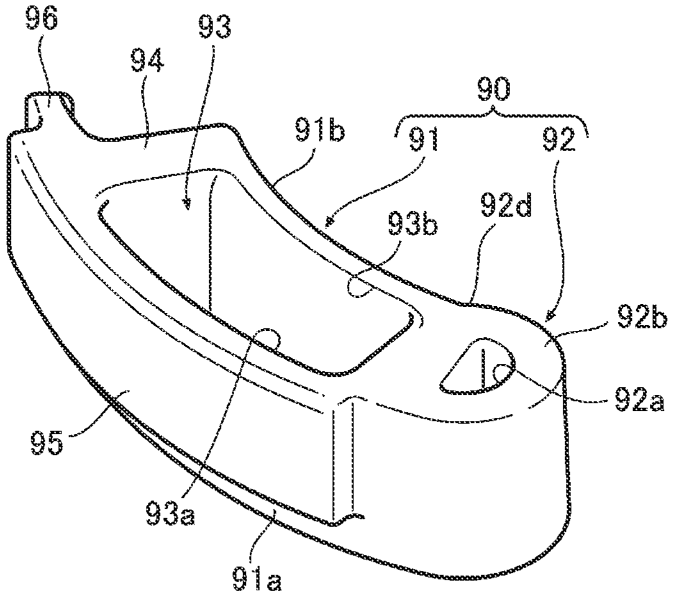
Figure 7B:
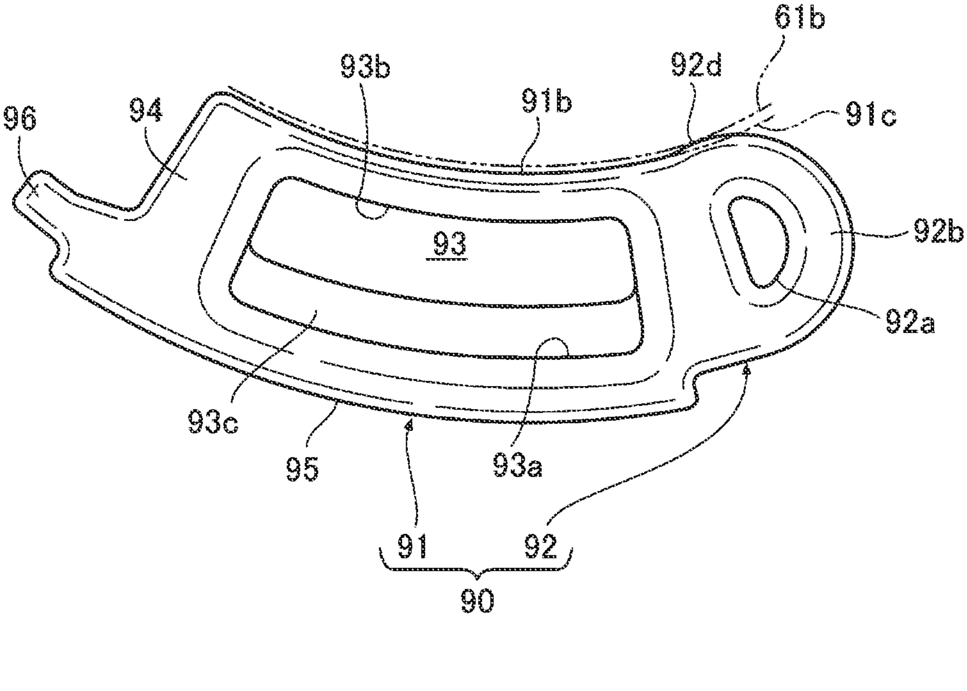

As illustrated in FIGS. 7A and 7B, the elastic member 90 is formed of a predetermined elastic material and has cushioning properties, and includes the base portion 91 that is locked and supported by the support portion 51 provided on the base 11, and the stopper portion 92 that abuts against the protruding portion (the first protruding portion 72) of the rotation body 60 and restricts a maximum rotation position of the rotation body 60 in a predetermined direction. The "predetermined direction" in the present embodiment refers to a direction in which the protruding portion (first protruding portion 72) of the rotation body 60 abuts against the stopper portion 92, that is, a direction indicated by the arrow F2 in FIGS. 12 to 14 (a direction opposite to the rotation urging direction of the rotation body 60 by the torsion spring 12 that is an urging member).

The elastic member 90 in the present embodiment has a thick block shape extending in a predetermined length and having a predetermined thickness in a manner of forming a curved surface shape as a whole so as to conform to the curved peripheral walls 22, 42 on the gear arrangement portion side of the first case 20 and the second case 40 of the base 11.

Both side surfaces 91*a*, 91*b* of the base portion 91 along the longitudinal direction thereof have a curved surface shape. One side surface 91*a* is a surface facing an inside of the peripheral walls 22, 42 on the gear arrangement portion side of both cases 20, 40. The other side surface 91*b* is a surface facing an outer side of the peripheral wall 61*b* of the gear portion 61 of the rotation body 60, and the other side surface 91*b* forms a "surface facing the outer periphery of the rotation body" in the present invention.

The support hole 93 into which the support portion 51 provided in the second case 40 of the base 11 is to be inserted and locked is formed inside the base portion 91, The support hole 93 extends along the longitudinal direction of the base portion 91, and has an elongated hole shape in which both inner surfaces 93*a*, 93*b* along the longitudinal direction have a curved shape. Further, the other longitudinal end portion of the base portion 91 forms the abutting portion 94, and in a state where the motor 13 is not operating and the worm 14 is not rotating, the second protruding portion 74 of the rotation body 60, which is rotationally urged by the torsion spring 12, abuts against the abutting portion 94 (see FIG. 12).

In addition, a rib 93*c* in the form of a thin protrusion protrudes along the circumferential direction from one inner surface 93*a* of the support hole 93 on a bottom portion side of the support hole 93 (a side positioned on the tip end portion side of the support portion 51 when the elastic member 90 is mounted on the support portion 51). As illustrated in FIG. 18, an inner space of the support hole 93 is defined by a diameter-reduced portion into which only the tip end portion side of the support portion 51 is inserted, and a diameter-increased portion which has a diameter larger than that of the diameter-reduced portion and into which the support portion 51 and the plurality of ribs 51*a* are inserted, via the rib 93*c*. When the support portion 51 is inserted into the support hole 93, the plurality of ribs 51*a* provided on the support portion 51 abut against the inner surface 93*a* of the diameter-increased portion of the support hole 93 to suppress rattling of the elastic member 90 relative to the support portion 51, and the locking step portion 53*b* of the support portion 51 is locked to a peripheral edge of a back side of the support hole 93, so that the base portion 91 is supported by the support portion 51, and the elastic member 90 is mounted on the support portion 51 (see FIG. 11B). In a state where the base portion 91 is supported by the support portion 51, and the elastic member 90 is mounted on the support portion 51, as illustrated in FIG. 12, most in the circumferential direction and a part in the width direction of the base portion 91 and the stopper portion 92 of the elastic member 90 are disposed between the first protruding portion 72 and the second protruding portion 74 on the outer periphery of the rotation body 60, excluding a protruding wall portion 95 and an extending portion 96, which will be described later.

Further, the protruding wall portion 95 that enters the cutout portion 55 of the second case 40 and closes the cutout portion 55 protrudes in a predetermined range from an end surface on a ceiling portion side of the base portion 91 (an end surface on the ceiling wall 41 side of the second case 40 when the elastic member 90 is mounted on the support portion 51) to the bottom portion side on the one side surface 91*a* of the base portion 91.

Regarding the elastic member 90 mounted on the support portion 51, when the base portion 91 is supported by the support portion 51, in a state where the second case 40 is assembled to the first case 20, a portion of the base portion 91 below the protruding wall portion 95 is accommodated and disposed in the elastic member arrangement recessed portion 27 of the first case 20, and a lower end portion of the protruding wall portion 95 is locked to an upper end portion of the peripheral wall 22 provided with the elastic member arrangement recessed portion 27 of the first case 20 (see FIG. 4A). In the above-described state, an upper end portion of the protruding wall portion 95 is locked to an upper end portion of the cutout portion 55 of the second case 40, and both circumferential end portions of the protruding wall portion 95 are locked to both circumferential end portions of the cutout portion 55, respectively, so that the cutout portion 55 is closed (see FIG. 11B). In a state where the elastic member 90 is mounted on the support portion 51, an outer surface of the protruding wall portion 95 of the elastic member 90 is flush with outer surfaces of the peripheral wall 42 and the wall portion 42*a* of the second case 40 at a peripheral edge of the cutout portion 55 (see FIG. 4B).

Further, as illustrated in FIGS. 7A and 7B, the extending portion 96 in the form of a plate narrower than the base portion 91 extends from a position close to the one side surface 91*a* on the other longitudinal end portion of the base portion 91. As illustrated in FIG. 10, in a state where a portion of the base portion 91 below the protruding wall portion 95 is accommodated and disposed in the elastic member arrangement recessed portion 27 of the first case 20, the extending portion 96 faces the other circumferential end portion side of the elastic member arrangement recessed portion 27 of the peripheral wall 22 of the first case 20 on the gear arrangement portion 24 side.

On the other hand, the stopper portion 92 extends from one longitudinal end portion of the base portion 91. In the stopper portion 92 in the present embodiment, a deformable hole 92*a* having a substantially semicircular shape on an inner side of the stopper portion 92 is formed, and a deformable wall portion 92*b* having an arch shape is formed through the deformable hole 92*a*. An outer periphery of the deformable wall portion 92*b* has a rounded curved surface shape.

Further, as illustrated in FIG. 12, the stopper portion 92 of the elastic member 90 is disposed in a manner of being biased in a direction opposite to the predetermined direction with respect to the base portion 91.

Specifically, as illustrated in FIG. 12, in a state where the base portion 91 is supported by the support portion 51 and the elastic member 90 is mounted on the support portion 51, the stopper portion 92 is disposed in a manner of being biased with respect to the base portion 91 in a direction (a rotation urging direction of the rotation body 60 by the torsion spring 12 that is an urging member, which is indicated by the arrow F1 in FIG. 12) opposite to the predetermined direction (a direction indicated by the arrow F2 in FIGS. 12 to 14), and it can be said that the stopper portion 92 is biased and protrudes in a direction in which the stopper portion 92 abuts against the protruding portion (the first protruding portion 72) of the rotation body 60. When viewed in the axial direction of the rotation body 60, the base portion 91 and the stopper portion 92 are disposed in a manner of being displaced with respect to the circumferential direction of the rotation body 60.

Further, the stopper portion 92 includes a bulging portion 92*d* bulging toward the outer surface of the rotation body 60 relative to a surface (the other side surface 91*b*) of the base portion 91 facing the outer periphery of the rotation body 60. In FIG. 7B, an imaginary outer surface 91*c* (a circumferential surface obtained by extending the side surface 91*b* with a certain diameter) of the side surface 91*b* of the base portion 91 is indicated by a two-dot chain line. As illustrated in FIG. 7B, the bulging portion 92*d* in the present embodiment is provided on the side surface 91*b* side of the base portion 91, which is the base end portion side of the arch-shaped deformable wall portion 92*b* of the stopper portion 92, so as to form a shape bulging toward the outer surface of the peripheral wall 61*b* of the gear portion 61 of the rotation body 60 relative to the imaginary outer surface 91*c*.

As illustrated in FIG. 4B, FIG. 11B, and FIG. 12, the stopper portion 92 of the elastic member 90 in a state where the base portion 91 is supported by the support portion 51 is disposed between the outer periphery of the rotation body 60, and the wall portion 22*a* on the first case 20 side and the wall portion 42*a* on the second case 40 side when the second case 40 is assembled to the first case 20.

As an elastic material forming the elastic member 90 described above, for example, a rubber material such as butyl rubber (isobutylene-isoprene rubber: IIR), nitrile rubber (NBR), ethylene propylene rubber (EPM, EPDM), butadiene rubber (BR), urethane-based rubber, silicone-based rubber, fluorine-based rubber, and acrylic rubber, or a thermoplastic elastic elastomer may be preferably used. In particular, it is preferable to use an elastic material having low rebound resilience (high impact absorbing ability).

All of the portions (the base portion 91, the stopper portion 92, the protruding wall portion 95, the extending portion 96, and the like) of the elastic member 90 are integrally formed.

Figure 8:
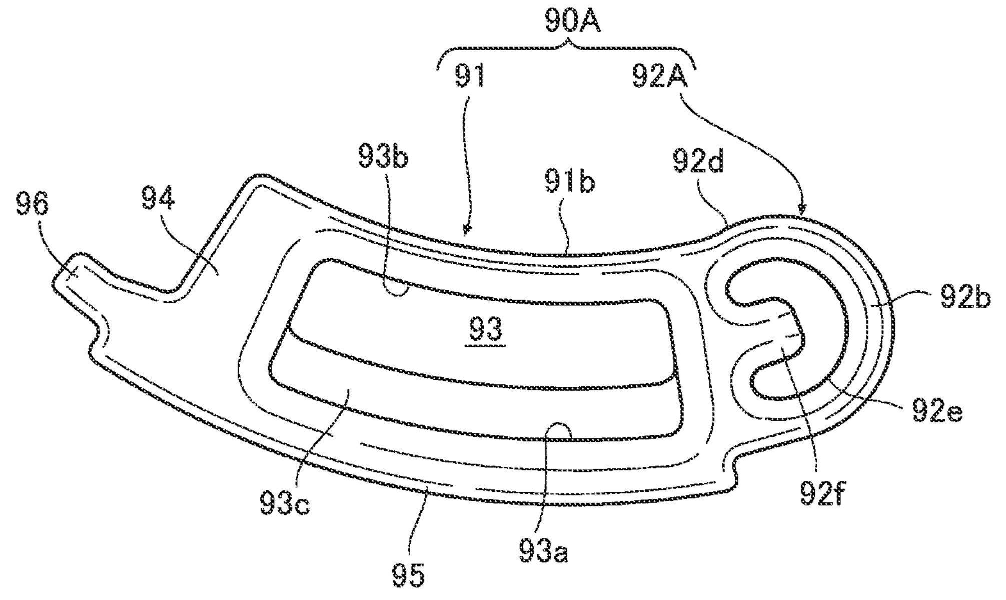
FIG. 8 is a plan view illustrating a modification of the elastic member of the locking device.

The elastic member described above is not limited to the shape and the structure described above, and may have any shape and structure as long as the elastic member includes at least a base portion and a stopper portion. For example, the elastic member may have a shape as illustrated in FIG. 8.

Regarding an elastic member 90A of the modification, a shape of a stopper portion 92A is mainly different from that of the stopper portion 92 of the elastic member 90. That is, regarding a stopper portion 92A, a projection portion 92*f* protrudes from a radial center of an inner surface of a deformable hole 92*e* on the base portion 91 side, and the deformable hole 92*e* has a substantially U-shape.

The elastic member 90 acts as follows in accordance with a rotation operation of the rotation body 60 to suppress a striking noise from the rotation body 60.

FIG. 12 shows a case where the motor 13 does not operate and the worm 14 does not rotate in a state where the base portion 91 is supported by the support portion 51 and the elastic member 90 is mounted on the support portion 51. In this state, the second protruding portion 74 of the rotation body 60, which is rotationally urged by the rotation urging force of the torsion spring 12, abuts against the abutting portion 94 of the elastic member 90 to restrict the rotational position of the rotation body 60, and the first protruding portion 72 (protruding portion in the present invention) of the rotation body 60 is disposed at a position separated from the stopper portion 92 of the elastic member 90 by a predetermined circumferential length. In this state, the outer periphery of the elastic member 90 on the rotation body 60 side (the side surface 91*b* of the base portion 91 and the bulging portion 92*d* of the stopper portion 92) does not abut against the outer periphery of the rotation body 60 (the peripheral wall 61*b* of the gear portion 61), and is separated from the outer periphery of the rotation body 60 with a predetermined gap therebetween.

Figure 13:
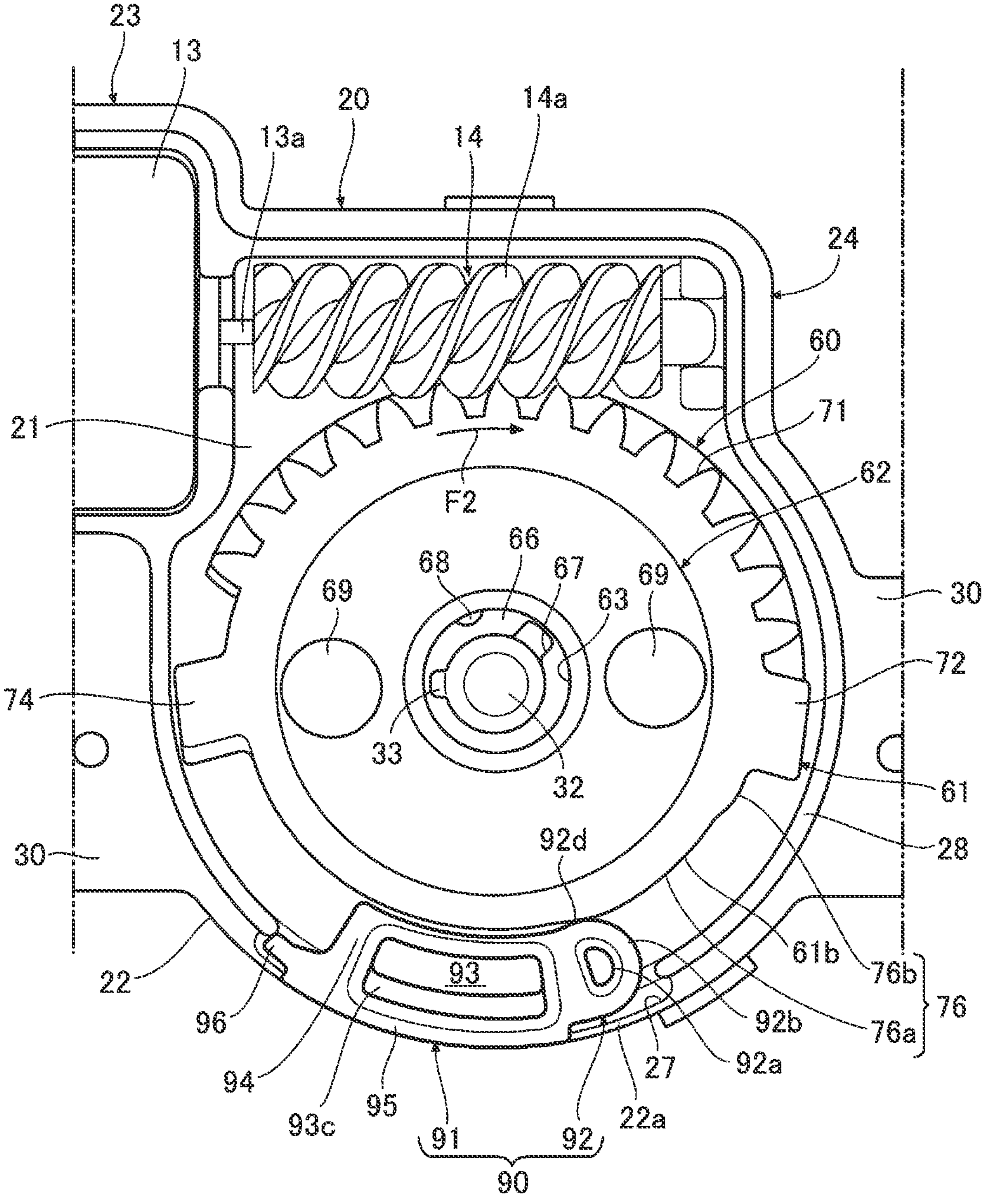
FIG. 13 is an illustration plan view illustrating a state where the rotation body is rotated from the state illustrated in FIG. 12.

When the motor 13 operates and the worm 14 rotates from the state illustrated in FIG. 12, the rotation body 60 rotates in a direction of the arrow F2 against the rotation urging force of the torsion spring 12. As illustrated in FIG. 13, the first protruding portion 72 approaches the stopper portion 92, and the sliding contact portion 76 of the rotation body 60 comes into sliding contact with the stopper portion 92. Here, the first sliding contact portion 76*a* of the sliding contact portion 76 is in sliding contact with the bulging portion 92*d* of the stopper portion 92. At this time, the bulging portion 92*d* is pressed by the first sliding contact portion 76*a*, so that a pressure contact force is applied between the first sliding contact portion 76*a* and the bulging portion 92*d*.

Figure 14:
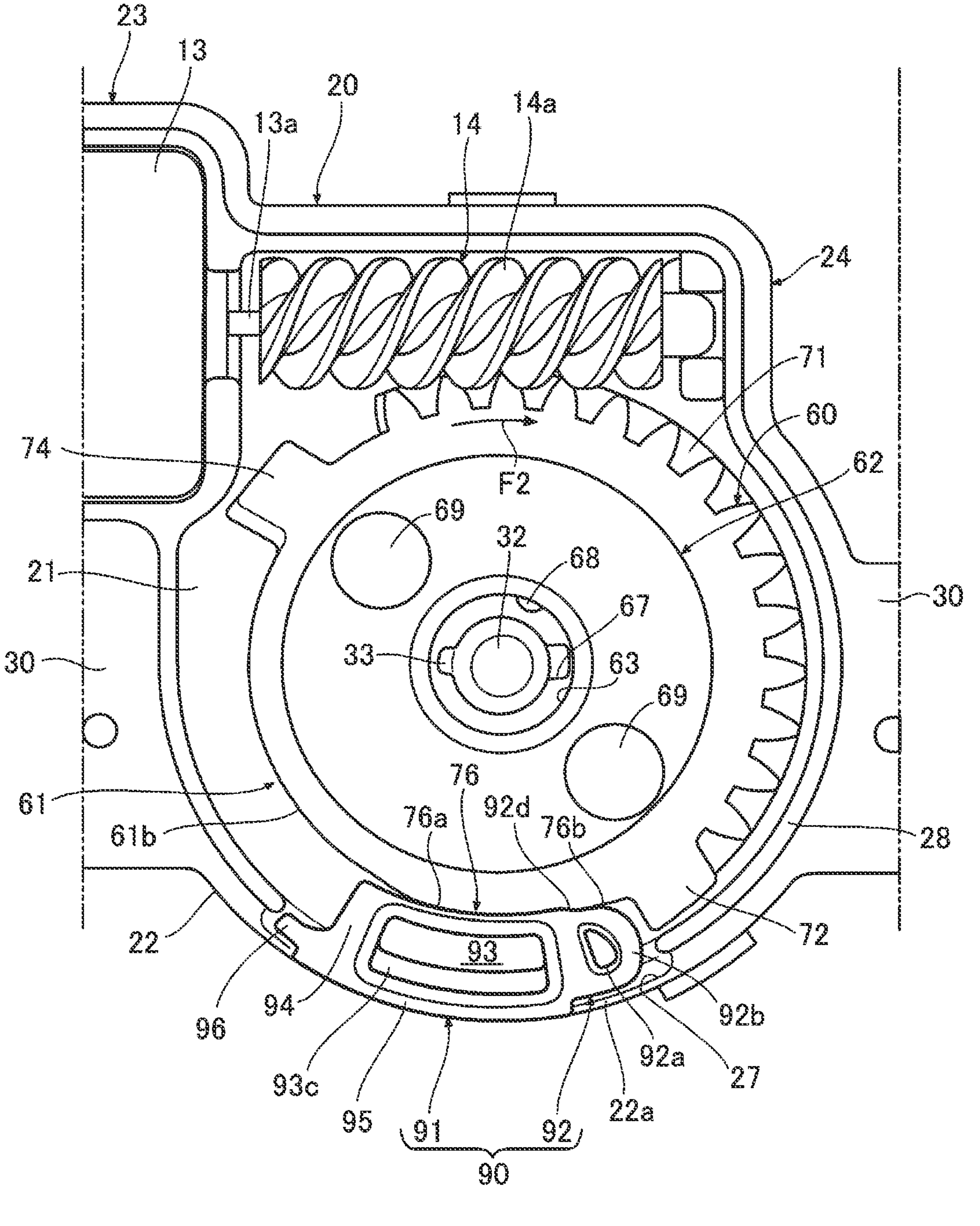
FIG. 14 is an illustration plan view illustrating a state where the rotation body is further rotated from the state illustrated in FIG. 13.
Figure 15:
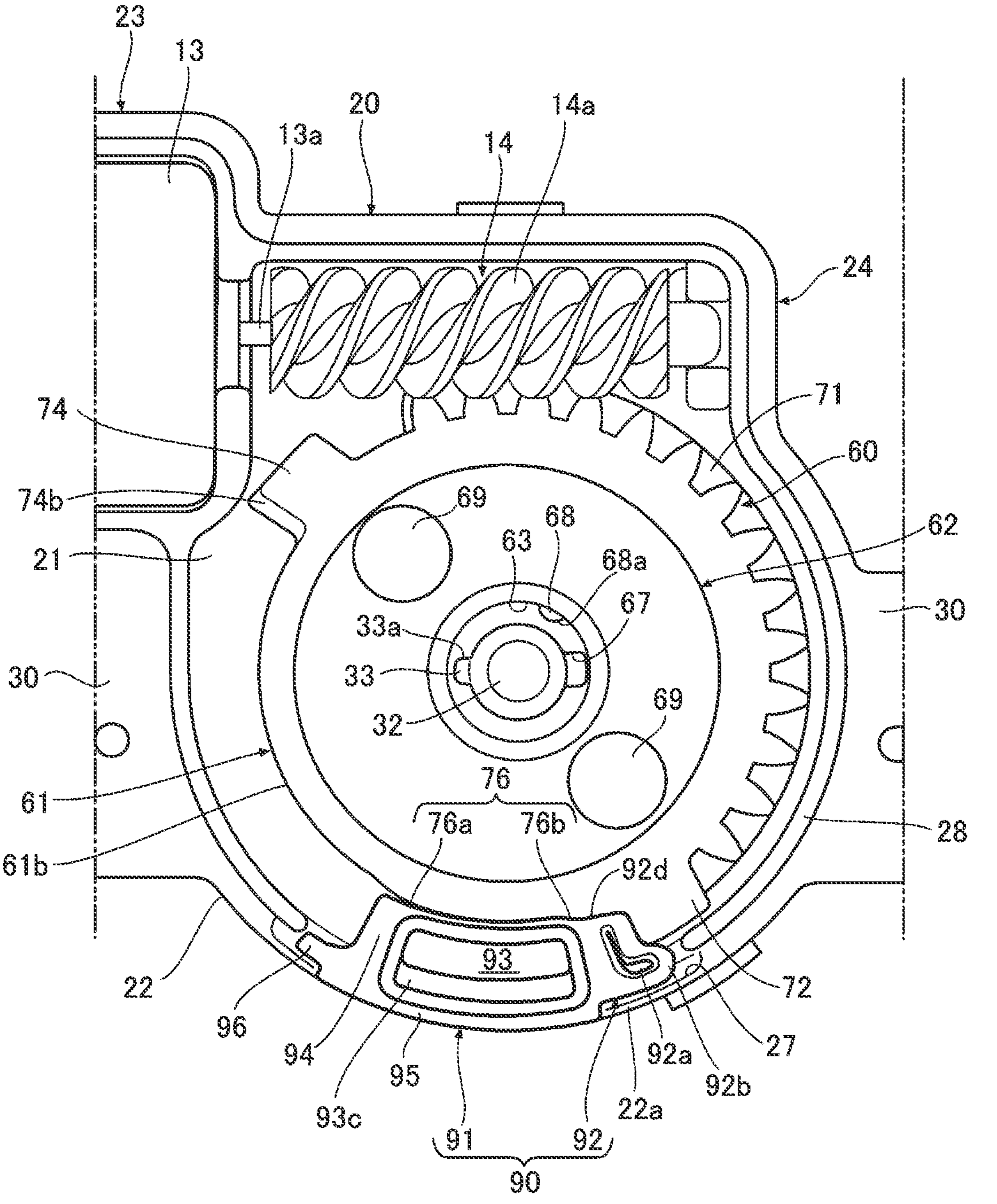
FIG. 15 is an illustration plan view illustrating a state where the rotation body is further rotated from the state illustrated in FIG. 14, and a rotational position of the rotation body is restricted.
Figure 16:
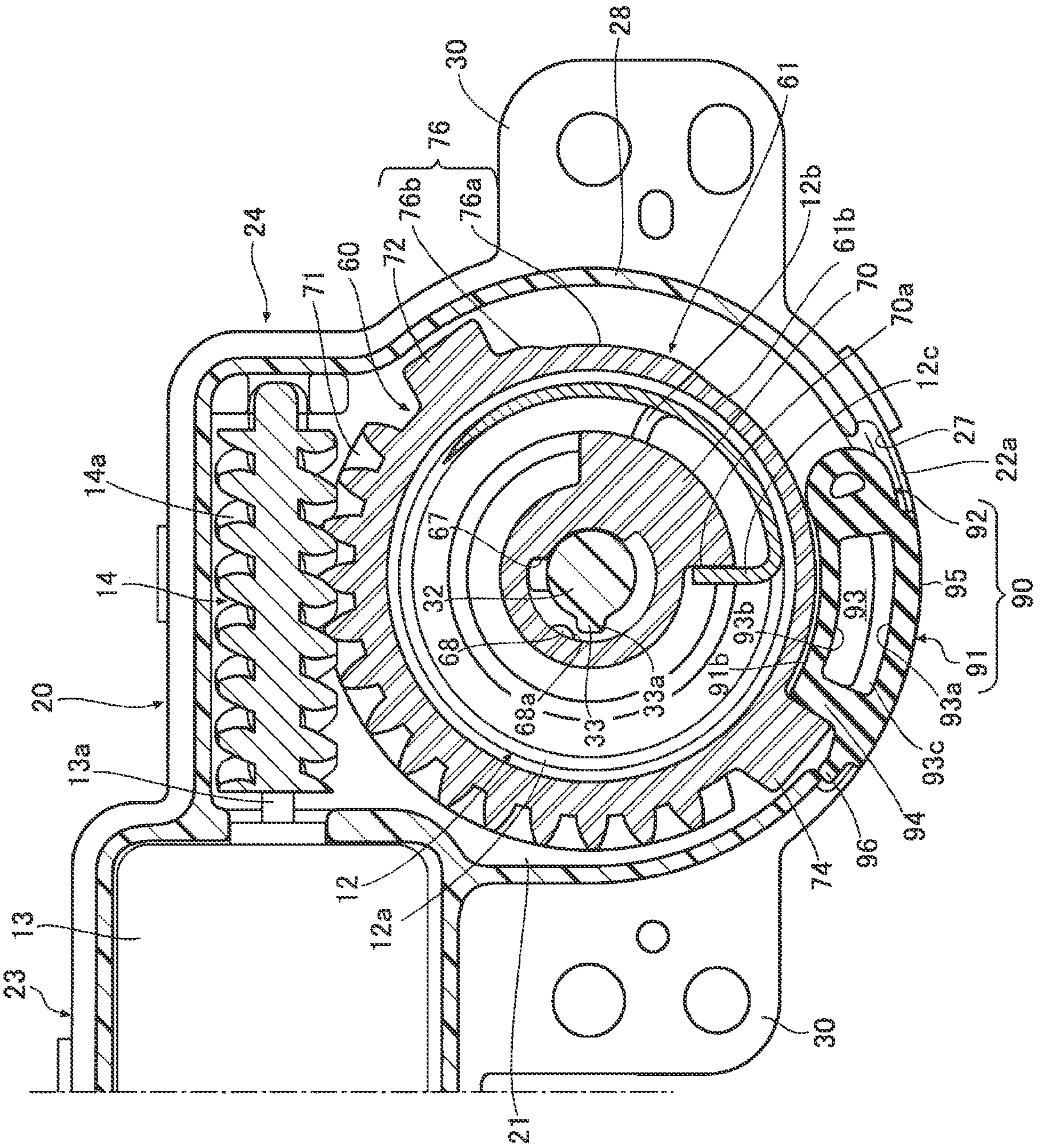
FIG. 16 is a cross-sectional view taken along a line B-B of FIG. 4B.

When the rotation body 60 further rotates in the direction of the arrow F2 from a state illustrated in FIG. 13 and the first protruding portion 72 approaches the stopper portion 92, the second sliding contact portion 76*b* of the sliding contact portion 76 comes into sliding contact with the bulging portion 92*d* of the stopper portion 92 as illustrated in FIG. 14. At this time, the bulging portion 92*d* is pressed by the second sliding contact portion 76*b*, the deformable wall portion 92*b* of the stopper portion 92 is bent and deformed so that an area of an opening of the deformable hole 92*a* is slightly reduced, and a pressure contact force is applied between the second sliding contact portion 76*b* and the bulging portion 92*d*.

When the rotation body 60 further rotates in the direction of the arrow F2 from a state shown in FIG. 14, the first protruding portion 72 abuts against (collides with) the outer periphery of the deformable wall portion 92*b* of the stopper portion 92 while maintaining the state where the sliding contact portion 76 is in sliding contact with the bulging portion 92*d* of the stopper portion 92. Then, the deformable wall portion 92*b* of the stopper portion 92 is pressed from the outer surface side by the first protruding portion 72, and the deformable wall portion 92*b* is bent and deformed so as to be crushed into a substantially L shape so that the opening of the deformable hole 92*a* is almost eliminated in the radial direction and slightly remains in the circumferential direction. Therefore, an impact force from the first protruding portion 72 of the rotation body 60 is absorbed, and further rotation of the rotation body 60 is restricted and the rotation body 60 is stopped when the first protruding portion 72 abuts against the bent and deformed deformable wall portion 92*b*.

As described above, regarding the locking device 10, in the process in which the rotation body 60 rotates against the rotation urging force of the torsion spring 12 and the first protruding portion 72 abuts against the stopper portion 92 to restrict the maximum rotational position, the sliding contact portions 76*a* and 76*b* of the rotation body 60 are brought into sliding contact with the bulging portion 92*d* of the stopper portion 92 to attenuate a rotational speed of the rotation body 60, and thereafter, the first protruding portion 72 abuts against the deformable wall portion 92*b* of the stopper portion 92 to cause the deformable wall portion 92*b* to be bent and deformed, so that the striking noise (collision sound) when the first protruding portion 72 of the rotation body 60 collides with the elastic member 90 is reduced.

Operation and Effect

Next, the operation and effect of the locking device 10 having the above-described structure will be described.

That is, when the opening and closing body 5 is pushed into the opening portion 2 in order to close the opening portion 2 of the fixed body 1, the tapered surfaces of the engaging portions 82, 82 of the pair of locking members 80, 81 are pressed against the inner surfaces on both sides of the opening portion 2, and the pair of locking members 80, 81 are pulled inward of the opening and closing body 5 against an urging force of the torsion spring 12. When the engaging portions 82, 82 reach the locking portions 3, 3, the rotation body 60 is rotationally urged by the urging force of the torsion spring 12 to push out the locking members 80, 81 toward the outside of the opening and closing body 5, and the engaging portions 82, 82 are engaged with the locking portions 3. 3, respectively, so that the opening portion 2 of the fixed body 1 can be locked in a state in which the opening portion 2 is closed by the opening and closing body 5 (see FIG. 1A and FIG. 19).

When the opening and closing body 5 is opened from the opening portion 2 of the fixed body 1, the switch 7 on the front surface side of the opening and closing body 5 is operated. Then, electricity is supplied to the motor 13 through the bus bars 17, 17 from the power supply connector connected to a power supply (not illustrated), the rotation shaft 13*a* of the motor 13 rotates and the worm 14 rotates, and the rotation body 60 rotates in the direction of the arrow F2 in FIGS. 12 to 14 against the rotation urging force of the torsion spring 12 in conjunction with the rotation of the worm 14. As a result, the engaging portions 82, 82 of the pair of locking members 80, 81 slide in the direction of separating from the locking portions 3, 3, and the engagement between the engaging portion 82 and the locking portion 3 is released. Therefore, the opening and closing body 5 can be moved from the opening portion 2 of the fixed body 1 to open the opening portion 2 of the fixed body 1 (see FIG. 1B and FIG. 20).

In the locking device 10, when the motor 13 operates and the worm 14 rotates from a state where the motor 13 does not operate and the worm 14 does not rotate as illustrated in FIG. 12, the rotation body 60 is rotated in a predetermined direction, that is, the rotation body 60 is rotated against the rotation urging force of the torsion spring 12 in a direction in which the first protruding portion 72 approaches the stopper portion 92 of the elastic member 90 (see the arrow F2 in FIGS. 12 to 14).

At this time, as described above, the first sliding contact portion 76*a* and the second sliding contact portion 76*b* of the sliding contact portion 76 of the rotation body 60 sequentially come into sliding contact with the stopper portion 92 of the elastic member 90 (here, the bulging portion 92*d* of the stopper portion 92), and finally, as illustrated in FIG. 15, the protruding portion (the first protruding portion 72) of the rotation body 60 collides with the stopper portion 92 while attenuating the rotational speed of the rotation body 60, thereby stopping the rotation of the rotation body 60.

At this time, as illustrated in FIG. 12, the stopper portion 92 of the elastic member 90 is disposed in a manner of being biased in the direction (the direction indicated by the arrow F1) opposite to the predetermined direction relative to the base portion 91, so that the rotation of the rotation body 60 can he stopped with cushioning properties, and the striking noise can be effectively reduced in combination with the rotational speed attenuating effect in the sliding contact portion 76.

As illustrated in FIG. 4B, FIG. 11B, and FIG. 12, in the present embodiment, the base 11 includes wall portions 22*a*, 42*a* disposed at positions facing the outer periphery of the rotation body 60, and the stopper portion 92 of the elastic member 90 is disposed between the outer periphery of the rotation body 60 and the wall portions 22*a*, 42*a*. Therefore, when the rotation body 60 rotates in a predetermined direction, that is, the rotation body 60 rotates against the rotation urging force of the torsion spring 12, and the first protruding portion 72 collides with the stopper portion 92, excessive bending deformation of the stopper portion 92 is suppressed, and the impact force can be effectively attenuated.

Further, as illustrated in FIGS. 7A and 7B, the stopper portion 92 in the present embodiment includes the bulging portion 92*d* bulging toward the outer surface of the rotation body 60 relative to the surface (the other side surface 91*b*) of the base portion 91 facing the outer periphery of the rotation body 60. Therefore, when the rotation body 60 rotates in the predetermined direction indicated by the arrow F2, that is, when the rotation body 60 rotates against the rotation urging force of the torsion spring 12, the sliding contact portion 76 (here, the first sliding contact portion 76*a* or the second sliding contact portion 76*b*) of the rotation body 60 is easily brought into sliding contact with the bulging portion 92*d* of the stopper portion 92, so that the rotational speed of the rotation body can be effectively attenuated, and the deflection margin of the stopper portion 92 when the first protruding portion 72 of the rotation body 60 collides with the stopper portion 92 can be increased, and the impact absorbing effect can be enhanced.

As illustrated in FIG. 12, the sliding contact portion 76 in the present embodiment has a shape extending along the outer periphery of the rotation body 60. Therefore, when the rotation body 60 rotates in the predetermined direction indicated by the arrow F2, that is, the rotation body 60 rotates against the rotation urging force of the torsion spring 12, and the sliding contact portion 76 of the rotation body 60 comes into sliding contact with the stopper portion 92, a long sliding contact distance can be ensured, and the striking noise accompanying the rotation of the rotation body 60 can be more effectively suppressed.

Further, in the present embodiment, as illustrated in FIG. 2, the motor 13 that rotates the rotation body 60 is provided. The base 11 is a case that accommodates the rotation body 60, the elastic member 90, and the motor 13 therein. The cutout portion 55 is formed on the outer periphery of the case at a position facing the support portion 51 to which the base portion 91 of the elastic member 90 is to he locked, and the base portion 91 of the elastic member 90 is supported by the support portion 51 so as to close the cutout portion 55.

According to the above aspect, the cutout portion 55 is formed on the outer periphery of the case (here, the second case 40), so that the support portion 51 can be close to the outer periphery side of the case. As a result, the thickness of the support portion 51 and the elastic member 90 can be ensured without changing the outer diameter of the case and the rotation body 60, and the cutout portion 55 of the case is closed by the base portion 91 of the elastic member 90 (here, closed by the protruding wall portion 95 of the base portion 91), so that the striking noise accompanying the rotation of the rotation body 60 can be more effectively suppressed.

Another Embodiment of Locking Device for Opening and Closing Body

FIGS. 21 to 24 illustrate another embodiment of the locking device for the opening and closing body according to the present invention. Substantially the same portions as those in the above embodiment are denoted by the same reference numerals, and the description thereof will be omitted.

A locking device 10A for an opening and closing body in the present embodiment (hereinafter, also simply referred to as "locking device 10A") has a structure in which the opening and closing body 5 is mechanically opened by human power of an operator, while the locking device 10 in the above embodiment has a structure in which the opening and closing body 5 is electrically opened.

Figure 21:
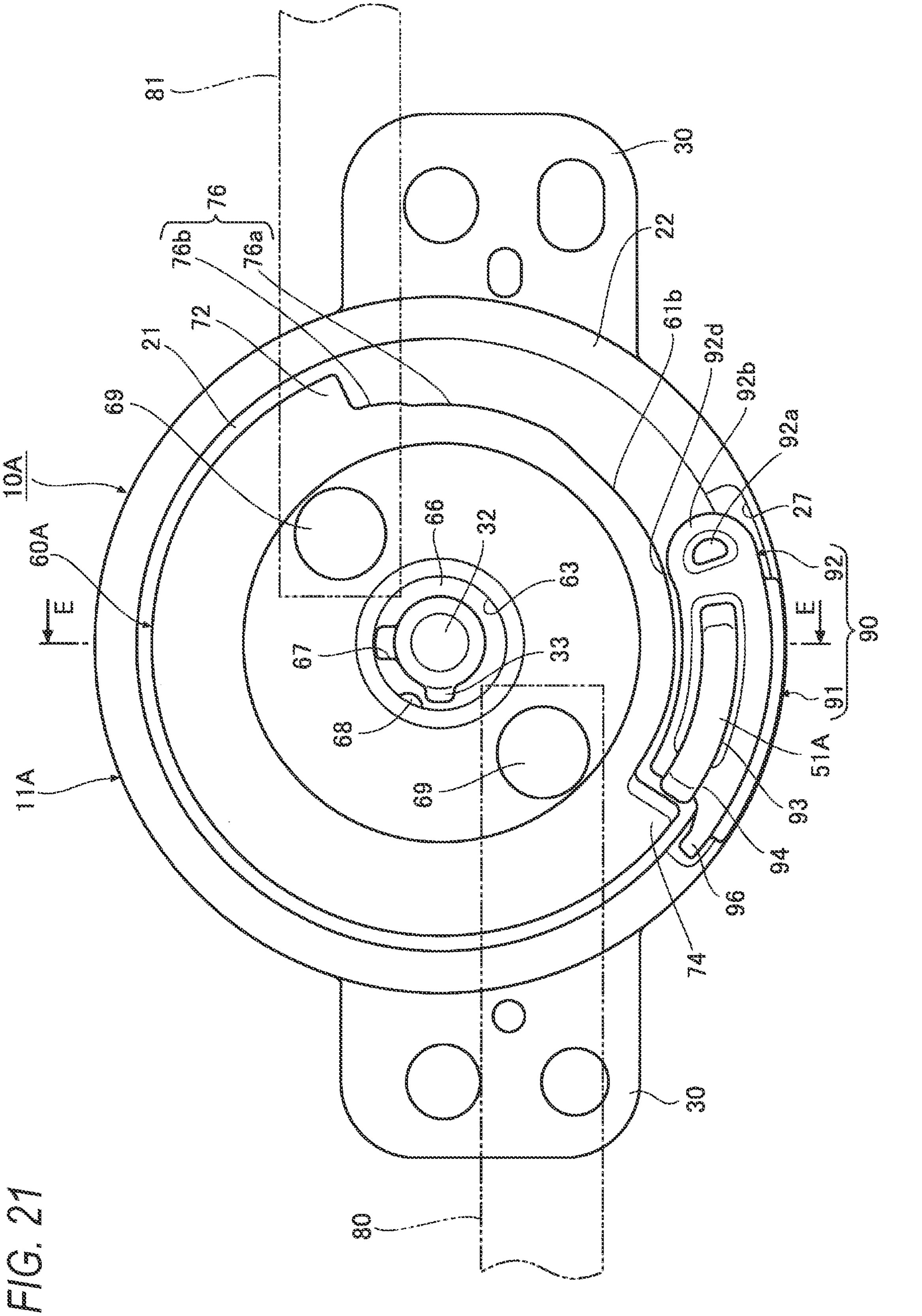
FIG. 21 is a plan view illustrating another embodiment of the locking device for the opening and closing body according to the present invention.
Figure 22:
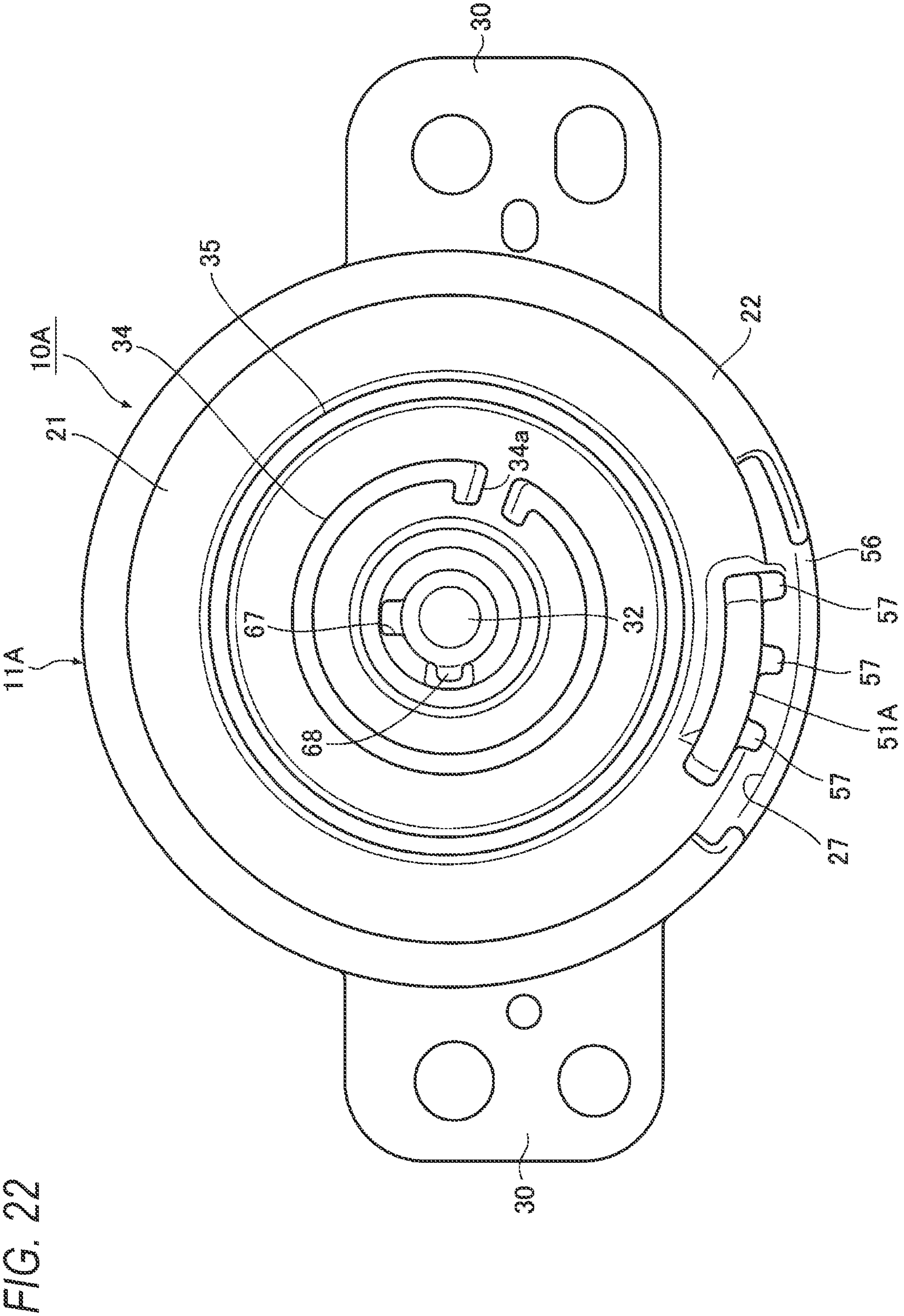
FIG. 22 is a plan view of a base of the locking device.
Figure 23:
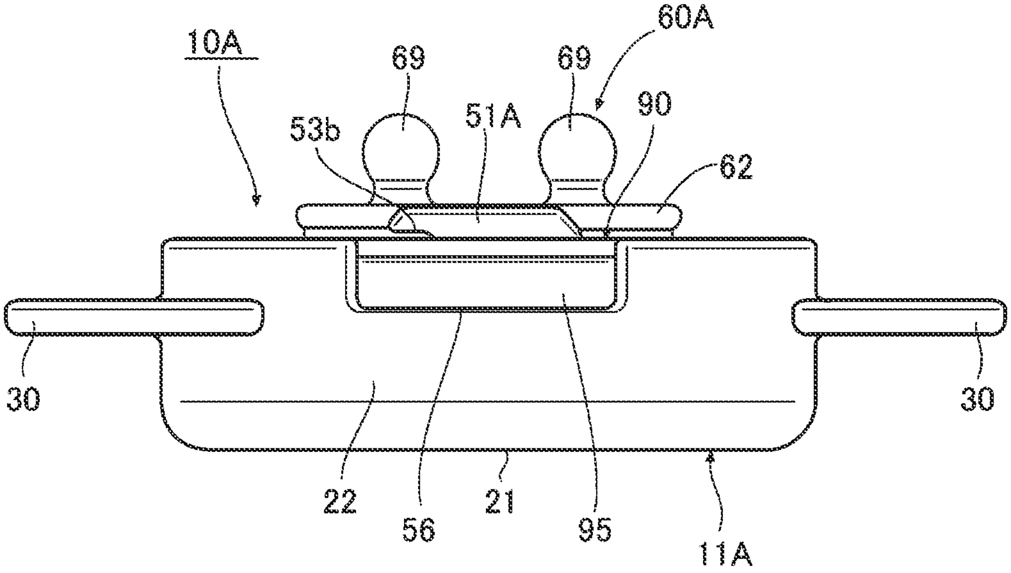
FIG. 23 is a front view of the locking device.
Figure 24:
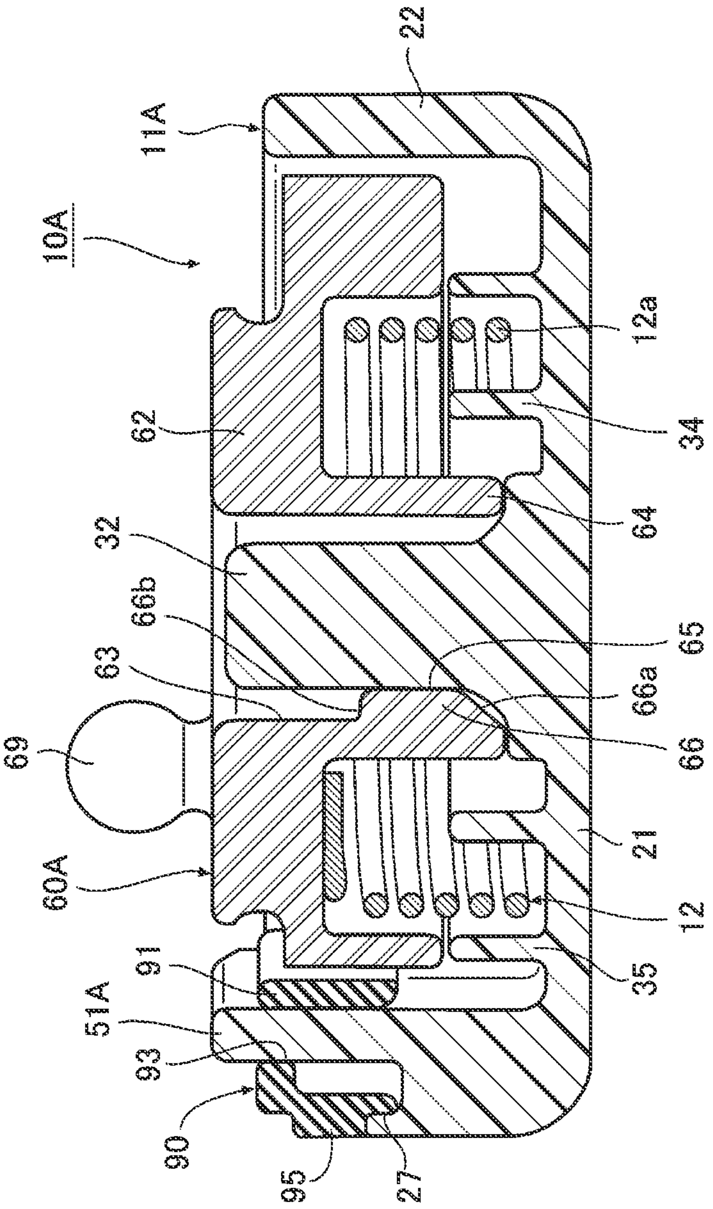
FIG. 24 is a cross-sectional view taken along a line E-E of FIG. 21.

As illustrated in FIGS. 21 and 22, a base 11A is formed in a substantially cylindrical bottomed frame shape that opens upward, and has substantially the same shape as the shape of the first case 20 on the gear arrangement portion 24 side in the above-described embodiment. In a state where the rotation body 60 is exposed from the upper opening of the base 11A, the rotation body 60 is rotatably supported via the support shaft 32 in a retained state (see FIGS. 23 and 24). That is, the rotation body 60 is rotatably accommodated and held in the base 11A. A support portion 51A for supporting the elastic member 90 protrudes from a predetermined. position in the circumferential direction of the bottom wall 21. Further, the elastic member arrangement recessed portion 27 and an opening portion 56 are formed on the outer peripheral side of the support portion 51A of the peripheral wall 22.

Unlike the rotation body 60 of the above-described embodiment, the rotation body 60A has a shape in which the teeth 71 are not formed on the outer periphery thereof. That is, a part of the outer periphery of the rotation body 60A is cut out in a predetermined range in the circumferential direction, the first protruding portion 72 (serving as a protruding portion of the present invention) is formed at one circumferential end portion of the part, the second protruding portion 74 is formed at the other circumferential end portion, and the sliding contact portion 76 is formed between both the protruding portions 72, 74. In addition, one of the pair of locking members 80, 81 pivotally supported by the pair of pivotally supporting portions 69, 69 of the rotation body 60 is slidably operated by an operation member (not illustrated), and as a result, the other locking member synchronously slides via the rotation body 60.

In the locking device 10A of the present embodiment, the same operation and effect as those of the lock device 10 of the above-described embodiment can also be obtained.

The present invention is not limited to the embodiment described above, and various modifications can be made within the scope of the gist of the present invention, and such embodiments are also included in the scope of the present invention.

REFERENCE SIGNS LIST

1 Fixed Body
2 Opening portion
3 Locking portion
5 Opening and closing body
10, 10A Locking device for opening and closing body (locking device)
10A Locking device
11, 11A Base
12 Torsion spring
13 Motor
14 Worm
20 First case
22*a* Wall portion
32 Support shaft
33 Projection portion
40 Second case
42*a* Wall portion
51 Support portion
55 Cutout portion
56 Opening portion
60 Rotation body
63 Shaft hole
71 Tooth
72 First protruding portion (protruding portion)

74 Second protruding portion
76 Sliding contact portion
76*a* First sliding contact portion
76*b* Second sliding contact portion
80, 81 Locking member
90, 90A Elastic member
91 Base portion
92, 92A Stopper portion
92*d* Bulging portion

The invention claimed is:

1. A locking device for an opening and closing body that is openably and closably attached to an opening portion of a fixed body, the locking device comprising:

a locking portion that is to be provided in one of the fixed body and the opening and closing body;

a base that is to be disposed on another of the fixed body and the opening and closing body;

a rotation body that is rotatably accommodated in or placed on the base and includes a protruding portion on a part of an outer periphery thereof;

a locking member that is configured to slide in conjunction with rotation of the rotation body and configured to engage with and disengage from the locking portion; and an elastic member that includes a base portion locked and supported by a support portion provided on the base, and a stopper portion configured to restrict a maximum rotation position of the rotation body in a predetermined direction by abutting against the protruding portion of the rotation body, wherein the stopper portion of the elastic member protrudes in a direction in which the stopper portion is to abut against the protruding portion relative to the base portion, wherein a part of the outer periphery of the rotation body is provided with a sliding contact portion that is configured to come into sliding contact with the elastic member in a process in which the protruding portion approaches the stopper portion, and wherein the sliding contact portion protrudes from a cylindrical peripheral wall of the rotation body toward an outer diameter direction.

2. The locking device for the opening and closing body according to claim 1, wherein the base includes a wall portion disposed at a position facing the outer periphery of the rotation body, and wherein the stopper portion of the elastic member is disposed between the outer periphery of the rotation body and the wall portion.

3. The locking device for the opening and closing body according to claim 1, wherein the stopper portion includes a bulging portion bulging toward an outer surface of the rotation body relative to a surface of the base portion facing the outer periphery of the rotation body.

4. The locking device for the opening and closing body according to claim 1, wherein the sliding contact portion of the rotation body has a shape extending along the outer periphery of the rotation body.

5. The locking device for the opening and closing body according to claim 1, further comprising:

a motor configured to rotate the rotation body, wherein the base is a case configured to accommodate the rotation body, the elastic member, and the motor therein, wherein a cutout portion is formed on an outer periphery of the case at a position facing the support portion to which the base portion of the elastic member is locked, and wherein the base portion of the elastic member is supported by the support portion so as to close the cutout portion.

6. The locking device for the opening and closing body according to claim 1, wherein the sliding contact portion includes a first sliding contact portion that protrudes from the cylindrical peripheral wall of the rotation body toward the outer diameter direction and a second sliding contact portion that protrudes from the first sliding contact portion toward the outer diameter direction.

* * * * *